(12) United States Patent
Lin et al.

(10) Patent No.: US 10,972,310 B2
(45) Date of Patent: Apr. 6, 2021

(54) LINK STATE PACKET TRANSMISSION METHOD AND ROUTING NODE

(71) Applicant: Huawei Technologies Co., Ltd., Shenzhen (CN)

(72) Inventors: Dong Lin, Shenzhen (CN); Zhongyan Fan, HongKong (CN); Kit Sang Tang, HongKong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/414,425

(22) Filed: May 16, 2019

(65) Prior Publication Data

US 2019/0273633 A1 Sep. 5, 2019

Related U.S. Application Data

(63) Continuation of application No. PCT/CN2017/109676, filed on Nov. 7, 2017.

(30) Foreign Application Priority Data

Nov. 16, 2016 (CN) .......................... 2016 1 1036894

(51) Int. Cl.
*G06F 15/173* (2006.01)
*H04L 12/44* (2006.01)
(Continued)

(52) U.S. Cl.
CPC .............. *H04L 12/44* (2013.01); *H04L 45/02* (2013.01); *H04L 45/04* (2013.01); *H04L 45/122* (2013.01);
(Continued)

(58) Field of Classification Search
CPC ....... H04L 12/44; H04L 45/04; H04L 45/122; H04L 45/245; H04L 45/26; H04L 45/02; H04L 45/42; H04L 45/50; H04L 2012/445
See application file for complete search history.

(56) References Cited

U.S. PATENT DOCUMENTS

2002/0147842 A1 10/2002 Breitbart et al.
2005/0152286 A1* 7/2005 Betts .................. H04L 45/04
370/255
(Continued)

FOREIGN PATENT DOCUMENTS

CN 1905512 A 1/2007
CN 101083624 A 12/2007
(Continued)

OTHER PUBLICATIONS

Fonseca; Beacon Vector Routing: Towards Scalable Point-to-Point Routing in Deeply Embedded Networks; 2003, 19 pages. (Year: 2003).*

(Continued)

*Primary Examiner* — Richard G Keehn
(74) *Attorney, Agent, or Firm* — Leydig, Voit & Mayer, Ltd.

(57) ABSTRACT

A link state packet transmission method and a routing node are disclosed. The method is applied to a tree topology, where the tree topology includes a leaf routing node, an intermediate routing node, and a root routing node. The method includes: receiving, by the intermediate routing node, a link state packet sent by a child routing node of the intermediate routing node; sending, by the intermediate routing node, the link state packet to the root routing node, where the root routing node is configured to aggregate received link state packets to obtain a link state packet set; receiving, by the intermediate routing node, the link state
(Continued)

packet set sent by the root routing node; and sending, by the intermediate routing node, the link state packet set to the child routing node of the intermediate routing node.

20 Claims, 10 Drawing Sheets

(51) Int. Cl.
| | |
|---|---|
| *H04L 12/715* | (2013.01) |
| *H04L 12/733* | (2013.01) |
| *H04L 12/709* | (2013.01) |
| *H04L 12/721* | (2013.01) |
| *H04L 12/717* | (2013.01) |
| *H04L 12/751* | (2013.01) |
| *H04L 12/723* | (2013.01) |

(52) U.S. Cl.
CPC ............ *H04L 45/245* (2013.01); *H04L 45/26* (2013.01); *H04L 45/42* (2013.01); *H04L 45/50* (2013.01); *H04L 2012/445* (2013.01)

(56) References Cited

U.S. PATENT DOCUMENTS

| | | | |
|---|---|---|---|
| 2006/0045024 A1 | 3/2006 | Previdi et al. | |
| 2008/0267116 A1* | 10/2008 | Kang | H04L 45/18 370/328 |
| 2012/0134357 A1* | 5/2012 | Ashwood Smith | H04L 45/00 370/390 |
| 2013/0336109 A1 | 12/2013 | Previdi et al. | |
| 2015/0124591 A1* | 5/2015 | Nakagawa | H04L 41/0659 370/225 |
| 2015/0207671 A1* | 7/2015 | Farkas | H04L 12/28 370/228 |
| 2015/0222557 A1* | 8/2015 | Bhattacharya | H04L 41/00 370/237 |
| 2015/0326469 A1* | 11/2015 | Kern | H04L 43/10 370/254 |
| 2016/0248658 A1* | 8/2016 | Patel | H04L 45/02 |

FOREIGN PATENT DOCUMENTS

| | | |
|---|---|---|
| CN | 101102272 A | 1/2008 |
| CN | 101272393 A | 9/2008 |
| CN | 102142970 A | 8/2011 |
| CN | 102170710 A | 8/2011 |
| CN | 103414644 A | 11/2013 |
| CN | 104320334 A | 1/2015 |
| CN | 104468387 A | 3/2015 |
| CN | 105282041 A | 1/2016 |
| EP | 2866377 A1 | 4/2015 |
| EP | 3157211 B1 | 11/2018 |
| WO | 2015106706 A1 | 7/2015 |

OTHER PUBLICATIONS

Kormaz et al., "Hybrid Flooding and Tree-based Broadcasting for Reliable and Efficient Link-state Dissemination", XP010636178, pp. 2400-2404, Institute of Electrical and Electronics Engineers, New York, New York (2002).

* cited by examiner

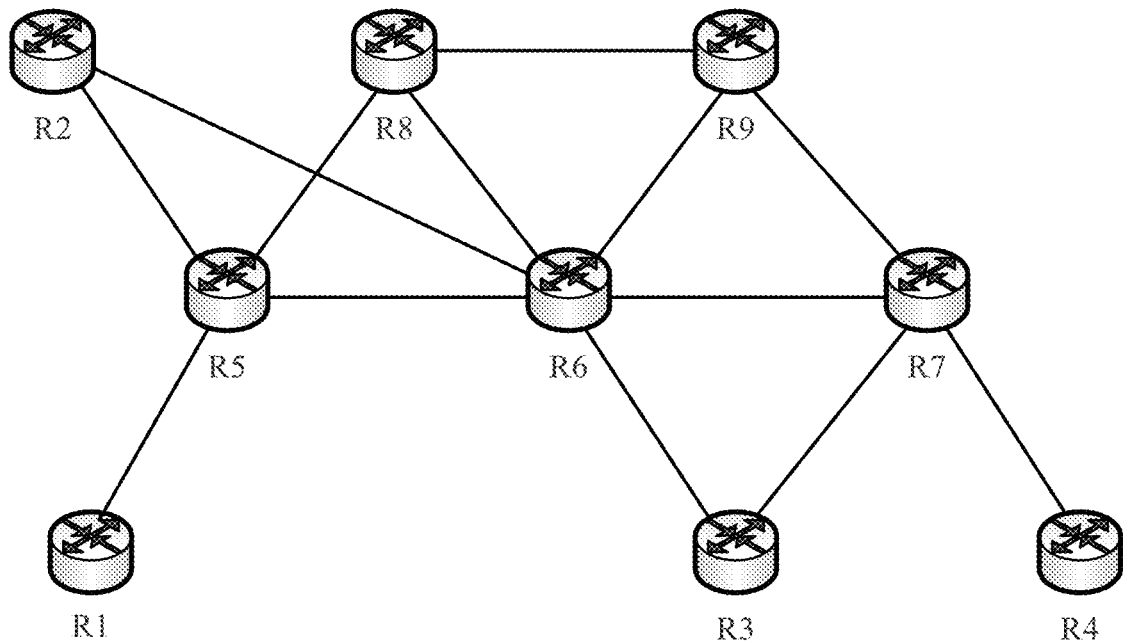

FIG. 4

```
┌─────────────────────────────────────────────────────────┐
│ A root routing node R8 sends a root routing node exit   │     501
│ message corresponding to the root routing node R8 to a  │    /
│ next-level neighboring routing node and a neighboring   │
│ root routing node, where the root routing node exit     │
│ message is used to indicate that the root routing node  │
│ R8 is no longer used as a root routing node             │
└─────────────────────────────────────────────────────────┘
                            │
                            ▼                                   502
┌─────────────────────────────────────────────────────────┐    /
│ Each routing node updates distance vector information   │
│ stored by each routing node                             │
└─────────────────────────────────────────────────────────┘
```

FIG. 5

LINK STATE PACKET TRANSMISSION METHOD AND ROUTING NODE

CROSS-REFERENCE TO RELATED APPLICATIONS

This application is a continuation of International Application No. PCT/CN2017/109676, filed on Nov. 7, 2017, which claims priority to Chinese Patent Application No. 201611036894.5, filed on Nov. 16, 2016. The disclosures of the aforementioned applications are hereby incorporated by reference in their entireties.

TECHNICAL FIELD

Embodiments of the present disclosure relate to the field of computer network technologies, and in particular, to a link state packet transmission method and a routing node.

BACKGROUND

In the Internet, internetwork packet forwarding is usually implemented by a router. Routing protocols run by the router may be classified depending on application scenarios into the Border Gateway Protocol between autonomous systems and an interior gateway protocol in an autonomous system. An autonomous system is an internetwork in which a single management mechanism implements management policies. A link state routing protocol is currently a most widely applied interior gateway protocol, and mainly includes the Open Shortest Path First Protocol OSPF) and the Intermediate System to Intermediate System Protocol (ISIS). The link state routing protocol is based on a Shortest Path First (SPF) algorithm. All routers in a topology perform the following link state universal routing process to achieve convergence: Each router detects interfaces of the router that are in an operating state, to learn a link directly connected to the router. For the link state routing protocol, the directly connected link is an interface on the router. The router can discover surrounding neighboring routers based on directly connected links. Each router floods its own link state packet (LSP) to all neighboring routers, and the LSP includes state information of each link directly connected to the router. Flooding herein means that an LSP received by an interface is sent from all interfaces except the interface. Then a neighboring router stores all received LSPs in a database. Next, each neighboring router floods LSPs to its own neighboring routers until all routers in an autonomous system receive the LSPs. Each router stores a copy of an LSP sent by a neighbor in a local database, to collect link state information of each router in the autonomous system and form a link state database described in the link state routing protocol. In this way, each router that runs the link state routing protocol can use the link state database to build a complete network topology diagram, and use the SPF algorithm to compute a best path to each destination router.

In the foregoing process, the flooding process in which "each router floods its own LSP to all neighboring routers, and then each neighboring router floods LSPs to its own neighboring routers" causes a large quantity of link state packets existing in a network, and a large quantity of network bandwidth is occupied, or the network is even completely down. This causes a broadcast storm and affects network performance.

SUMMARY

Embodiments of the present disclosure provide a link state packet transmission method and a routing node, so as to reduce a quantity of link state packets in a network and avoid a broadcast storm.

According to a first aspect, an embodiment of the present disclosure provides a link state packet transmission method, where the method is applied to a tree topology, and the tree topology includes a leaf routing node, an intermediate routing node, and a root routing node. The method includes: receiving, by the intermediate routing node, a link state packet sent by a child routing node of the intermediate routing node; sending, by the intermediate routing node, the link state packet to the root routing node, where the root routing node is configured to aggregate received link state packets to obtain a link state packet set; receiving, by the intermediate routing node, the link state packet set sent by the root routing node; and sending, by the intermediate routing node, the link state packet set to the child routing node of the intermediate routing node. In this embodiment of the present disclosure, the intermediate routing node sends the received link state packet to the root routing node, so that the root routing node aggregates the link state packets to obtain the link state packet set, and the intermediate routing node then sends the received link state packet set to the child node instead of sending the received link state packets to all neighboring nodes in a flooding manner. Therefore, a quantity of data link state packets in a network can be reduced, thereby avoiding a broadcast storm.

In a possible design, the sending, by the intermediate routing node, the link state packet to the root routing node includes: sending, by the intermediate routing node based on first distance vector information, the link state packet to a first neighboring routing node that has a shortest distance to all root routing nodes less than a shortest distance from the intermediate routing node to all the root routing nodes, where the first distance vector information includes the shortest distance from the intermediate routing node to all the root routing nodes and shortest distances separately from all neighboring routing nodes of the intermediate routing node to all the root routing nodes; and if the first neighboring routing node is a root routing node, the first neighboring routing node is configured to receive the link state packet, or if the first neighboring routing node is an intermediate routing node, the first neighboring routing node is configured to send the link state packet to a neighboring routing node that has a shortest distance to all the root routing nodes less than the shortest distance from the first neighboring routing node to all the root routing nodes. In this embodiment of the present disclosure, the intermediate routing node sends the received link state packet to its own parent node based on the distance vector information instead of sending the received link state packet to all its own neighboring nodes, thereby reducing the quantity of link state packets in the network. In addition, the intermediate routing node sends, by using the parent node, the link state packet to a root node nearest to the intermediate routing node, so as to increase a transmission rate of the link state packet and reduce transmission overheads.

In a possible design, the child routing node is a neighboring routing node of the intermediate routing node; and the sending, by the intermediate routing node, the link state packet set to the child routing node of the intermediate routing node includes: sending, by the intermediate routing node based on the first distance vector information, the link state packet set to a second neighboring routing node that has a shortest distance to all the root routing nodes greater than the shortest distance from the intermediate routing node to all the root routing nodes, where the first distance vector information includes the shortest distance from the intermediate routing node to all the root routing nodes and the shortest distances separately from all the neighboring routing nodes of the intermediate routing node to all the root routing nodes; and if the second neighboring routing node is a leaf routing node, the second neighboring routing node is configured to receive the link state packet set, or if the second neighboring routing node is an intermediate routing node, the second neighboring routing node is configured to send the link state packet set to a neighboring routing node that has a shortest distance to all the root routing nodes greater than the shortest distance from the second neighboring routing node to all the root routing nodes. In this embodiment of the present disclosure, the intermediate routing node sends the received link state packet set to its own child node based on the distance vector information instead of sending the received link state packet set to all its own neighboring nodes, thereby reducing the quantity of link state packets in the network.

In a possible design, before the receiving, by the intermediate routing node, a link state packet sent by a child routing node of the intermediate routing node, the method further includes: receiving, by the intermediate routing node, indication information, where the indication information is used to indicate which routing nodes are used as the root routing nodes; and determining, by the intermediate routing node based on a routing vector routing algorithm, the shortest distance from the intermediate routing node to all the root routing nodes and the shortest distances separately from all the neighboring routing nodes of the intermediate routing node to all the root routing nodes, and generating the first distance vector information based on the shortest distance from the intermediate routing node to all the root routing nodes and the shortest distances separately from all the neighboring routing nodes of the intermediate routing node to all the root routing nodes. In this embodiment of the present disclosure, the intermediate routing node learns in advance which routing nodes are the root routing nodes. Therefore, distance vector information is mutually transferred between routing nodes to update the distance vector information stored in the intermediate routing node.

In a possible design, the method further includes: when it is determined that a first preset condition is met, sending, by the intermediate routing node, a root routing node application request to one or more root routing nodes in all the root routing nodes, where the root routing node application request is used to indicate that the intermediate routing node requests to be upgraded to a root routing node; and if the intermediate routing node receives a root routing node application response sent by the one or more root routing nodes, updating, by the intermediate routing node, the first distance vector information, where the root routing node application response is used to indicate that the intermediate routing node has been upgraded to a root routing node. In this embodiment of the present disclosure, the intermediate routing node can apply to an existing root routing node to become a root routing node, so as to implement dynamic adjustment of the root routing node.

In a possible design, the method further includes: receiving, by the intermediate routing node, a root routing node exit message sent by the root routing node, where the root routing node exit message is used to indicate that the root routing node is no longer used as a root routing node; and updating, by the intermediate routing node, the first distance vector information. In this embodiment of the present disclosure, the root routing node may no longer be a root routing node, so as to implement dynamic adjustment of the root routing node.

In a possible design, the first preset condition includes: a quantity of existing root nodes is less than or equal to a first preset threshold, or transmission bandwidth of a root node is lower than a second preset threshold.

According to a second aspect, an embodiment of the present disclosure provides a link state packet transmission method, where the method is applied to a tree topology, and the tree topology includes a leaf routing node, an intermediate routing node, and a root routing node. The method includes: sending, by the leaf routing node, its own link state packet to the intermediate routing node, where the intermediate routing node is configured to send the link state packet to the root routing node, and the root routing node is configured to aggregate received link state packets to obtain a link state packet set; and receiving, by the leaf routing node, the link state packet set sent by the intermediate routing node. In this embodiment of the present disclosure, the leaf routing node sends its own link state packet to the intermediate routing node, so that the intermediate routing node forwards the link state packet to the root routing node, the root routing node aggregates the link state packets to obtain the link state packet set, and the intermediate routing node then sends the received link state packet set to the leaf node instead of sending the received link state packets to all neighboring nodes in a flooding manner. Therefore, a quantity of data link state packets in a network can be reduced, thereby avoiding a broadcast storm.

In a possible design, the intermediate routing node is a neighboring routing node of the leaf routing node; and the sending, by the leaf routing node, its own link state packet to the intermediate routing node includes: sending, by the leaf routing node based on second distance vector information, the link state packet to a neighboring routing node that has a shortest distance to all root routing nodes less than a shortest distance from the leaf routing node to all the root routing nodes, where the second distance vector information includes the shortest distance from the leaf routing node to all the root routing nodes and shortest distances separately from all neighboring routing nodes of the leaf routing node to all the root routing nodes; and if the neighboring routing node is a root routing node, the neighboring routing node is configured to receive the link state packet, or if the neighboring routing node is an intermediate routing node, the neighboring routing node is configured to send the link state packet to a neighboring routing node that has a shortest distance to all the root routing nodes less than the shortest distance from the neighboring routing node to all the root routing nodes. In this embodiment of the present disclosure, the leaf routing node sends the received link state packet to its own parent node based on the distance vector information, and sends, by using the parent node, the link state packet to a root node nearest to the leaf node, so as to increase a transmission rate of the link state packet and reduce transmission overheads.

In a possible design, before the sending, by the leaf routing node, its own link state packet to the intermediate routing node, the method further includes: receiving, by the leaf routing node, indication information, where the indication information is used to indicate which routing nodes are used as the root routing nodes; and determining, by the leaf routing node based on a routing vector routing algorithm, the shortest distance from the leaf routing node to all the root routing nodes and the shortest distances separately from all the neighboring routing nodes of the leaf routing node to all the root routing nodes, and generating the second distance vector information based on the shortest distance from the leaf routing node to all the root routing nodes and the shortest distances separately from all the neighboring routing nodes of the leaf routing node to all the root routing nodes. In this embodiment of the present disclosure, the leaf routing node learns in advance which routing nodes are the root routing nodes. Therefore, distance vector information is mutually transferred between routing nodes to update the distance vector information stored in the leaf routing node.

In a possible design, the method further includes: when it is determined that a first preset condition is met, sending, by the leaf routing node, a root routing node application request to one or more root routing nodes in all the root routing nodes, where the root routing node application request is used to indicate that the leaf routing node requests to be upgraded to a root routing node; and if the leaf routing node receives a root routing node application response sent by the one or more root routing nodes, updating, by the leaf routing node, the second distance vector information, where the root routing node application response is used to indicate that the leaf routing node has been upgraded to a root routing node. In this embodiment of the present disclosure, the leaf routing node can apply to an existing root routing node to become a root routing node, so as to implement dynamic adjustment of the root routing node.

In a possible design, the method further includes: receiving, by the leaf routing node, a root routing node exit message sent by the root routing node, where the root routing node exit message is used to indicate that the root routing node is no longer used as a root routing node; and updating, by the leaf routing node, the second distance vector information. In this embodiment of the present disclosure, the root routing node may no longer be a root routing node, so as to implement dynamic adjustment of the root routing node.

In a possible design, the first preset condition includes: a quantity of existing root nodes is less than or equal to a first preset threshold, or transmission bandwidth of a root node is lower than a second preset threshold.

According to a third aspect, an embodiment of the present disclosure provides a link state packet transmission method, where the method is applied to a tree topology, and the tree topology includes a leaf routing node, an intermediate routing node, and a root routing node. The method includes: receiving, by the root routing node, a link state packet sent by the intermediate routing node, and aggregating received link state packets to obtain a link state packet set; and sending, by the root routing node, the link state packet set to the intermediate routing node and a neighboring root routing node, where the intermediate routing node is configured to send the link state packet set to the leaf routing node, and the neighboring root routing node is configured to send the link state packet to a child routing node of the neighboring root routing node. In this embodiment of the present disclosure, the root routing node is responsible for receiving a link state packet sent by a non-root routing node and aggregating link state packets, and then sending an aggregated link state packet set to a non-root routing node instead of sending the received link state packets to all neighboring nodes in a flooding manner. Therefore, a quantity of data link state packets in a network can be reduced, thereby avoiding a broadcast storm.

In a possible design, the sending, by the root routing node, the link state packet set to the intermediate routing node and a neighboring root routing node includes: sending, by the root routing node based on third distance vector information, the link state packet set to a neighboring routing node that has a shortest distance to all root routing nodes greater than or equal to a shortest distance from the root routing node to all the root routing nodes, where the third distance vector information includes the shortest distance from the root routing node to all the root routing nodes and shortest distances separately from all neighboring routing nodes of the root routing node to all the root routing nodes; and if the neighboring routing node is a leaf routing node, the neighboring routing node is configured to receive the link state packet set, or if the neighboring routing node is an intermediate routing node, the neighboring routing node is configured to send the link state packet set to a neighboring routing node that has a shortest distance to all the root routing nodes greater than the shortest distance from the neighboring routing node to all the root routing nodes. In this embodiment of the present disclosure, the root routing node sends the aggregated link state packet set to its own child node and the neighboring root node based on the distance vector information, and sends the link state packet set to the leaf node by using the child node. Therefore, non-root nodes at a same level do not transfer the link state packet set to each other, thereby avoiding a ping pong phenomenon.

In a possible design, before the receiving, by the root routing node, a link state packet sent by the intermediate routing node, the method further includes: receiving, by the root routing node, indication information, where the indication information is used to indicate which routing nodes are used as the root routing nodes; and determining, by the root routing node based on a routing vector routing algorithm, the shortest distance from the root routing node to all the root routing nodes and the shortest distances separately from all the neighboring routing nodes of the root routing node to all the root routing nodes, and generating the third distance vector information based on the shortest distance from the root routing node to all the root routing nodes and the shortest distances separately from all the neighboring routing nodes of the root routing node to all the root routing nodes. In this embodiment of the present disclosure, the root routing node learns in advance which routing nodes are the root routing nodes. Therefore, distance vector information is mutually transferred between routing nodes to update the distance vector information stored in the root routing node.

In a possible design, the method further includes: receiving, by the root routing node, a root routing node application request sent by the intermediate routing node or the leaf routing node, where the root routing node application request is used to indicate that the intermediate routing node or the leaf routing node requests to be upgraded to a root routing node; and if the root routing node determines that the intermediate routing node or the leaf routing node can be upgraded to a root routing node, sending, by the root routing node, a root routing node application response to the intermediate routing node or the leaf routing node, where the root routing node application response is used to indicate that the intermediate routing node or the leaf routing node has been upgraded to a root routing node. In this embodiment of the present disclosure, the intermediate routing node or the leaf routing node can apply to an existing root routing node to become a root routing node, so as to implement dynamic adjustment of the root routing node.

In a possible design, the method further includes: when it is determined that a second preset condition is met, sending, by the root routing node, a root routing node exit message to a child routing node of the root routing node, where the root routing node exit message is used to indicate that the root routing node is no longer used as a root routing node. In this embodiment of the present disclosure, the root routing node may no longer be a root routing node, so as to implement dynamic adjustment of the root routing node.

In a possible design, the second preset condition includes: a quantity of existing root nodes is greater than or equal to a third preset threshold, or transmission bandwidth of a root node is higher than a fourth preset threshold.

According to a fourth aspect, an embodiment of the present disclosure provides an intermediate routing node, including a module or a unit configured to perform the link state packet transmission method according to any one of the first aspect or the implementations of the first aspect.

According to a fifth aspect, an embodiment of the present disclosure provides a leaf routing node, including a module or a unit configured to perform the link state packet transmission method according to any one of the second aspect or the implementations of the second aspect.

According to a sixth aspect, an embodiment of the present disclosure provides a root routing node, including a module or a unit configured to perform the link state packet transmission method according to any one of the third aspect or the implementations of the third aspect.

According to a seventh aspect, the present disclosure provides a routing node, including a processor and a memory, where the memory is configured to store an instruction, and the processor is configured to call the instruction in the memory to perform the method according to any one of the first aspect or the possible implementations of the first aspect, or the method according to any one of the second aspect or the possible implementations of the second aspect, or the method according to any one of the third aspect or the possible implementations of the third aspect.

According to an eighth aspect, an embodiment of the present disclosure provides a network system, including: the intermediate routing node according to any one of the fourth aspect or the possible implementations of the fourth aspect, and the leaf routing node according to any one of the fifth aspect or the possible implementations of the fifth aspect.

According to a ninth aspect, an embodiment of the present disclosure provides a network system, including: the intermediate routing node according to any one of the fourth aspect or the possible implementations of the fourth aspect, and the root routing node according to any one of the sixth aspect or the possible implementations of the sixth aspect.

According to a tenth aspect, an embodiment of the present disclosure provides a computer storage medium, configured to store a computer software instruction used by the intermediate routing node, where the computer software instruction includes a program used to execute the first aspect and designed for the intermediate routing node.

According to an eleventh aspect, an embodiment of the present disclosure provides a computer storage medium, configured to store a computer software instruction used by the leaf routing node, where the computer software instruction includes a program used to execute the second aspect and designed for the leaf routing node.

According to a twelfth aspect, an embodiment of the present disclosure provides a computer storage medium, configured to store a computer software instruction used by the root routing node, where the computer software instruction includes a program used to execute the third aspect and designed for the root routing node.

The technical solutions provided in the embodiments of the present disclosure may be applied to a network of a network topology that has a plurality of routing nodes. In the embodiments of the present disclosure, the network topology is changed to a tree network topology based on a plurality of root routing nodes. A non-root node reports its own link state packet to the root routing node, and the root routing node is responsible for aggregating link state packets, and then sends an aggregated link state packet set to each non-root node. Therefore, a flooding manner is no longer used for non-directional sending of a link packet, and a quantity of link packets in a network is reduced, thereby avoiding a broadcast storm.

These aspects or other aspects of the embodiments of the present disclosure may be clearer and easier to understand in descriptions of the following embodiments.

BRIEF DESCRIPTION OF DRAWINGS

To describe the technical solutions in the embodiments of the present disclosure more clearly, the following briefly describes the accompanying drawings used to describe the embodiments.

FIG. 4 is a schematic diagram of another tree structure according to an embodiment of the present disclosure;

FIG. 5 is a schematic flowchart of no longer using a root routing node as a root routing node according to an embodiment of the present disclosure;

DESCRIPTION OF EMBODIMENTS

Figure 1A:
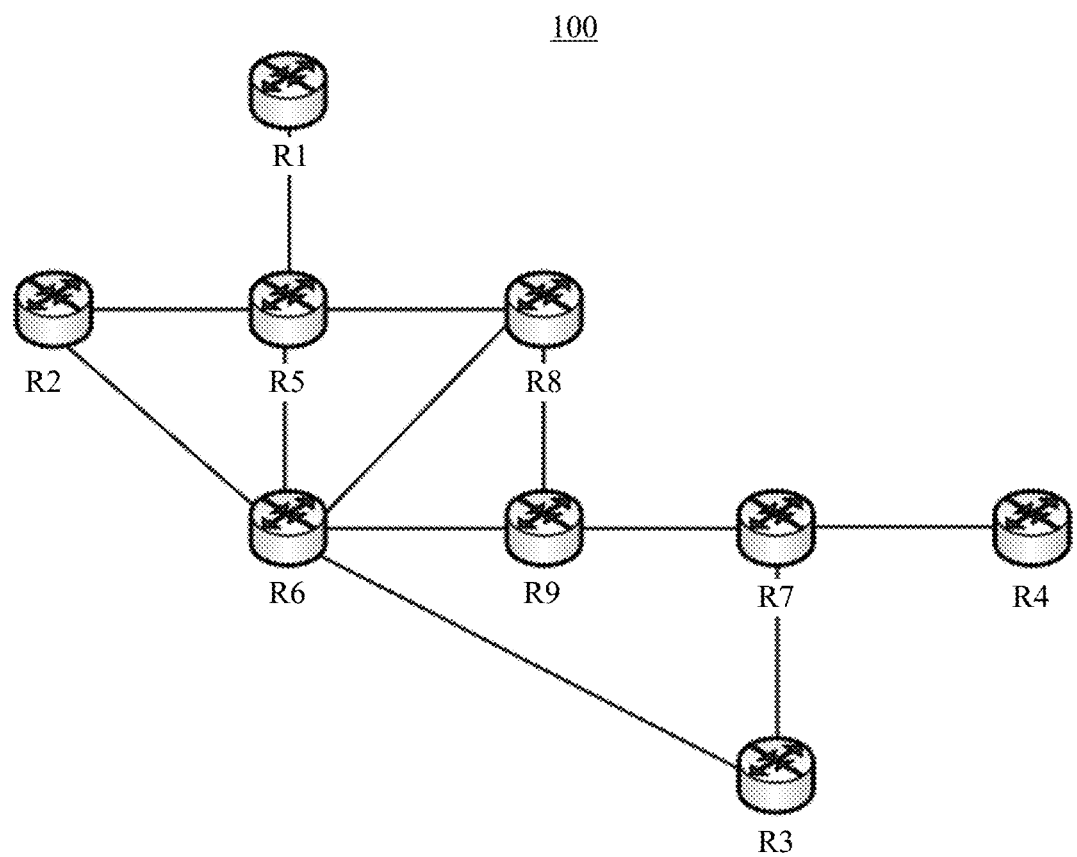
FIG. 1A is a schematic diagram of a network topology according to an embodiment of the present disclosure.

FIG. 1A is a schematic diagram of a network topology according to an embodiment of the present disclosure. For convenience of description, in the following embodiments, a router is described as a routing node. It is assumed that an autonomous system 100 includes nine routers, and the nine routers are respectively named R1, R2, R3, R4, R5, R6, R7, R8, and R9. R1 is connected to R5, R2 is separately connected to R5 and R6, R3 is separately connected to R6 and R7, R4 is connected to R7, R5 is separately connected to R1, R2, R6, and R8, R6 is separately connected to R2, R3, R5, R7, R8, and R9, R7 is separately connected to R3, R4, R6, and R9, R8 is separately connected to R5, R6, and R9, and R9 is separately connected to R6, R7, and R8.

In a link state routing protocol, each router is responsible for "greeting" neighboring routers on directly connected links. A router uses the Hello Protocol to discover all neighbors on links of the router to form an adjacency relationship. The neighbor herein is any other router that enables a same link state routing protocol. These small Hello packets are continuously exchanged between two adjacent routers, to implement a "keepalive" function to monitor a status of a neighbor. If the router no longer receives a Hello packet of a neighboring router, it is considered that the neighboring router is not reachable, and the adjacency relationship is broken. Adjacent routers exchange network link state information by sending LSPs. The LSP includes state information of each link directly connected to a router. The information includes but is not limited to: a neighboring router identifier (ID), a link type, bandwidth, a serial number, and expiration information. Upon establishing an adjacency relationship, a router may create an LSP and send its own LSP only to a neighboring router that establishes the adjacency relationship with the router. In addition, the router may further receive an LSP, sent by the neighboring router, of the neighboring router, or an LSP, sent by the neighboring router, of another router. In this way, each router receives LSPs of all routers in the autonomous system, and a set of all the LSPs forms a link state database. Because each LSP is a description of a network topology of a router, an entire link state database is a real reflection of a network topology of the autonomous system. For example, in this embodiment of the present disclosure, R1 sends its own LSP to R5. After receiving the LSP sent by R1, R5 sends the LSP of R1 to other neighboring routing nodes except R1, that is, R2, R6, and R8. After receiving the LSP of R1 sent by R5, R2, R6, and R8 further send the LSP of R1 to other neighboring routing nodes except R5. For example, R2 sends the LSP of R1 to R6, R6 sends the LSP of R1 to R2, R3, R8, and R9, and R8 sends the LSP of R1 to R6 and R9. After receiving the LSP of R1, each routing node sends the LSP to other neighboring routing nodes except the routing node that sends the LSP. Likewise, another routing node also floods its own LSP to other routing nodes in the autonomous system in this manner. This process of sending the LSP in a flooding manner may cause that a network is flooded with a large quantity of broadcast LSPs. If there are a relatively large quantity of routers in the autonomous system, a larger quantity of LSPs may be caused, and a risk of a broadcast storm may be brought.

In this embodiment of the present disclosure, to reduce the quantity of LSPs in the network, a topology diagram including a large quantity of routers may be changed to a multi-root hierarchical tree structure that uses K routing nodes as root routing nodes, where K is a positive integer. Each non-root routing node sends its own LSP to a root routing node. The root routing node is responsible for collecting the LSP of each non-root routing node, so as to aggregate LSPs. After aggregation, the root routing node sends the aggregated LSPs to a neighboring root routing node and each non-root routing node. Therefore, an original flooding manner of non-directional sending of an LSP is changed to a manner of directional sending of an LSP, and a quantity of LSPs transmitted in the network can be reduced, thereby avoiding a broadcast storm. In specific implementation, the root routing node may set a timer. When the timer reaches a threshold, the root routing node sends the currently aggregated LSPs to the neighboring root routing node and each non-root routing node.

Specifically, a network system administrator may select K routers from the foregoing nine routers as the root routing nodes based on a greedy algorithm or another algorithm and the network topology shown in FIG. 1A. In specific implementation, the network system administrator enters an instruction by using a user interface of any one of the foregoing nine routers, where the instruction is used to instruct the router to select the K routers from the foregoing nine routers as the root routing nodes. Alternatively, a dedicated control device controls, in a centralized manner, the foregoing nine routers, and the network system administrator enters an instruction by using a user interface of the control device, where the instruction is used to instruct the control device to select the K routers from the foregoing nine routers as the root routing nodes. In this embodiment of the present disclosure, an example in which K is 2 and the routing node R8 and the routing node R9 are finally determined root routing nodes is used for description.

After the root routing nodes are selected, the network system administrator triggers sending of a selected result (that is, routing node information of R8 and R9) to routing nodes of all routers in the autonomous system 100 in a flooding manner. For example, the network system administrator enters an instruction by using a user interface of the routing node R1, where the instruction is used to instruct to select the routing node R8 and the routing node R9 as the root routing nodes. After receiving the instruction, the routing node R1 sends a packet to a neighboring router, where the packet is used to instruct to select the routing node R8 and the routing node R9 as the root routing nodes. After receiving the packet, the neighboring routing node further sends the packet to its own neighboring routing nodes. Finally, all the routers in the autonomous system 100 receive the packet. Therefore, all routing nodes in the autonomous system 100 learn that the root routing nodes selected by the network system administrator are the routing node R8 and the routing node R9. Afterwards, each router computes and stores distance vector information. The distance vector information may be in a form of a distance vector table. Each router maintains a distance vector table, and then updates the distance vector table by using a distance vector advertisement between neighboring routers. Finally, the distance vector table maintained by each router records a shortest distance from a routing node of any router to any root routing node and a shortest distance from a routing node of any router to all root routing nodes, that is, each router obtains distance vector information of all the routers in the entire autonomous system. For a format of the distance vector table, refer to Table 1.

TABLE 1

|  | Shortest distance to a root routing node R8 | Shortest distance to a root routing node R9 | Shortest distance to all root routing nodes |
|---|---|---|---|
| Routing node R1 | 2 | 3 | 2 |
| Routing node R2 | 2 | 2 | 2 |
| Routing node R3 | 2 | 2 | 2 |
| Routing node R4 | 3 | 2 | 2 |
| Routing node R5 | 1 | 2 | 1 |
| Routing node R6 | 1 | 1 | 1 |
| Routing node R7 | 2 | 1 | 1 |
| Routing node R8 | 0 | 1 | 0 |
| Routing node R9 | 1 | 0 | 0 |

In this embodiment of the present disclosure, a shortest path from the routing node R1 to the root routing node R8 is R1-R5-R8. Therefore, the shortest distance is 2. A shortest path from the routing node R1 to the root routing node R9 is R1-R5-R8-R9 or R1-R5-R6-R9. Therefore, the shortest distance is 3. With reference to the shortest distance 2 from the routing node R1 to the root routing node R8 and the shortest distance 3 from the routing node R1 to the root routing node R9, a shortest distance from the routing node R1 to all the root routing nodes (that is, the root routing node R8 and the root routing node R9) is 2. Likewise, computing methods of a shortest distance from another root routing node to each root routing node and a shortest distance from the another root routing node to all the root routing nodes are the same as those described above. Details are not described herein again.

It should be noted that the distance vector table maintained by each routing node may alternatively include only a shortest distance from the routing node to each root routing node, a shortest distance from the routing node to all the root routing nodes, a shortest distance from a neighboring routing node to each root routing node, and a shortest distance from the neighboring routing node to all the root routing nodes. For the routing node R1, a neighboring routing node is R5. Therefore, a distance vector table stored in R1 needs to include the shortest distance 2 from R1 to the root routing node R8, the shortest distance 3 from R1 to the root routing node R9, the shortest distance 2 from R1 to the root routing node R8 and the root routing node R9, a shortest distance 1 from R5 to the root routing node R8, a shortest distance 2 from R5 to the root routing node R9, and a shortest distance 1 from R5 to the root routing node R8 and the root routing node R9. Another routing node is similar thereto, and details are not described herein again.

The root routing nodes may be selected based on the greedy algorithm or another algorithm, and the greedy algorithm is used as an example to describe a solution of how to select the root routing nodes. The network system administrator randomly selects two routing nodes from the foregoing nine routing nodes as the root routing nodes, and it is assumed that the routing nodes R1 and R2 are selected as the root routing nodes. The remaining routing nodes are allocated to a nearest routing node in the routing nodes R1 and R2 based on a relative distance to form two clusters, and it is assumed that R5 and R8 are allocated to the root routing node R1, and R3, R4, R6, R7, R8, and R9 are allocated to the root routing node R2. Afterwards, root routing nodes in the two clusters are reselected based on a relative distance of each routing node in each cluster, so that distances from other routing nodes different from the root routing node in the cluster to the root routing node are the smallest. The foregoing process is repeated until the root routing nodes in the two clusters no longer change. Herein, it is assumed that R8 and R9 are the finally determined root routing nodes.

Figure 1B:
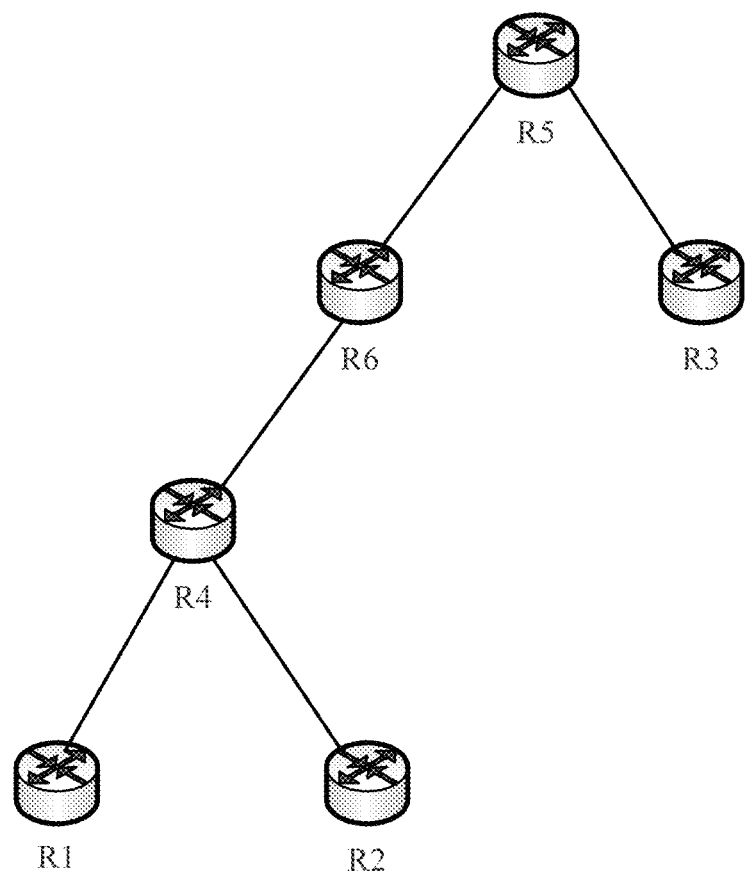
FIG. 1B is a schematic diagram of a tree structure according to an embodiment of the present disclosure.
Figure 1C:
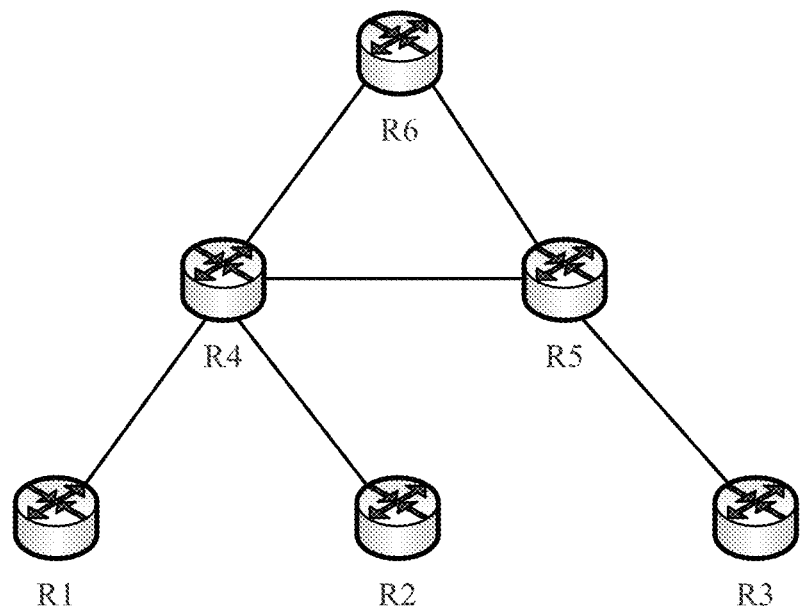
FIG. 1C is a schematic diagram of another tree structure according to an embodiment of the present disclosure.

It should be noted that an objective of determining the root routing nodes by using the foregoing greedy algorithm is to ensure that a height of a tree is reduced to a greatest extent. The height of the tree affects information transmission efficiency. Therefore, the height of the tree is reduced to a greatest extent, and LSP transmission efficiency can be improved. As shown in FIG. 1B, the routing node R5 is selected as the root routing node of the tree, and the height of the tree is 3. As shown in FIG. 1C, the routing node R6 is selected as the root routing node of the tree, and the height of the tree is only 2. Selecting the routing node R6 can significantly reduce an average delay of LSP information propagation.

Figure 1D:
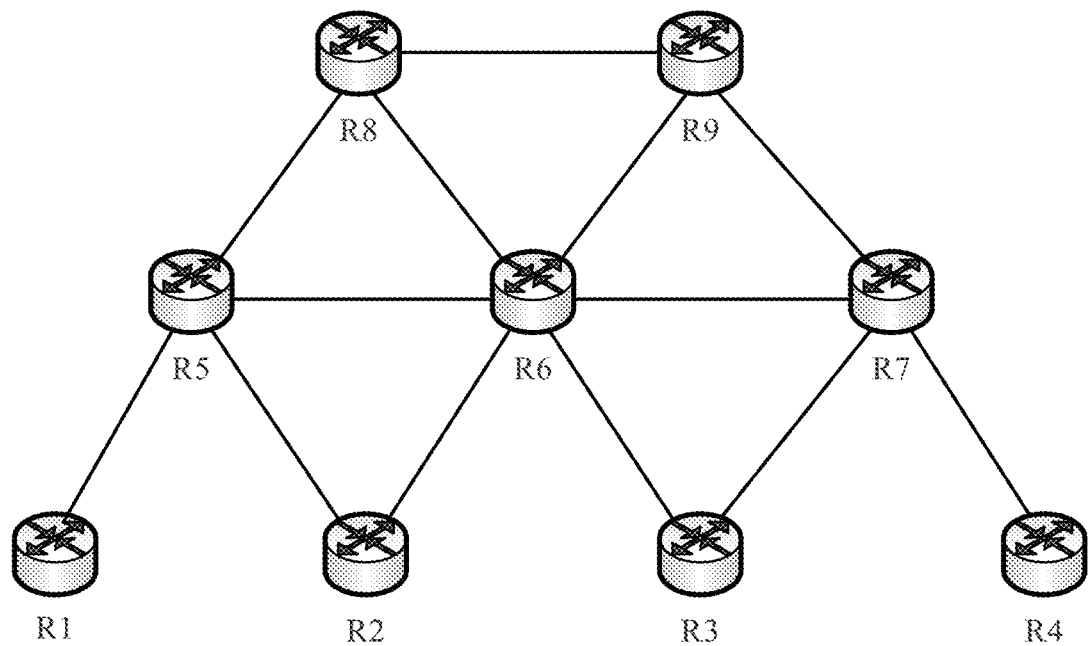
FIG. 1D is a schematic diagram of a tree structure corresponding to the topology shown in FIG. 1A.

After the distance vector table of each routing node is updated, the autonomous system 100 presents a multi-root hierarchical tree structure that uses two routing nodes as the root routing nodes. Referring to FIG. 1D, FIG. 1D is a schematic diagram of a tree structure corresponding to the topology shown in FIG. 1A. It may be learned from FIG. 1D that a topology diagram is changed to a hierarchical tree structure, and connection relationships between routing nodes are not modified. In this embodiment of the present disclosure, other routing nodes different from the root routing nodes send their own LSPs to the root routing nodes. The root routing node aggregates LSPs sent by child routing nodes, and after aggregation, the root routing node sends the aggregated LSPs to the child routing nodes. Therefore, in this embodiment of the present disclosure, a quantity of LSPs can be greatly reduced, thereby avoiding a broadcast storm.

Figure 2:
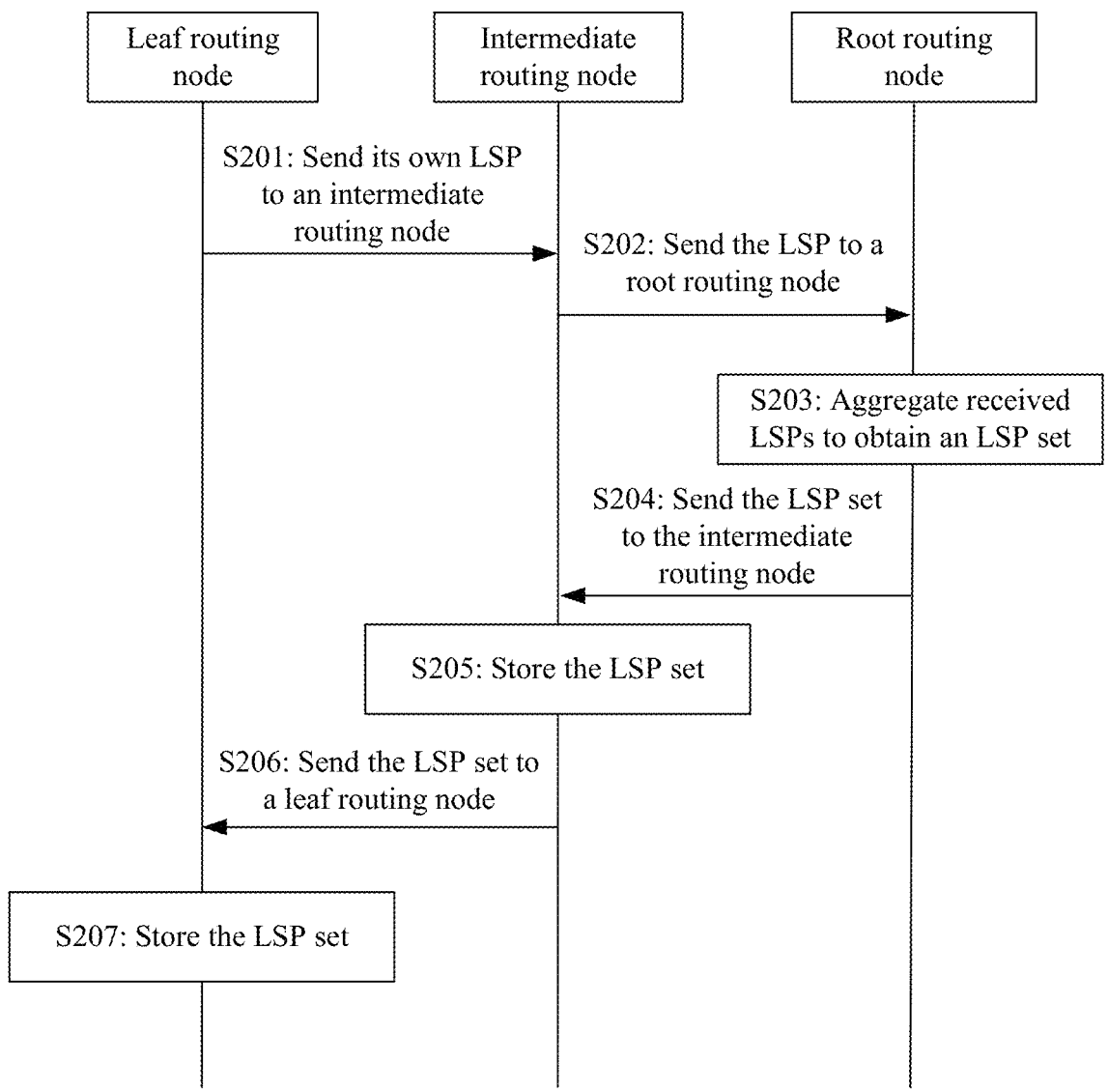
FIG. 2 is a schematic flowchart of a link state packet transmission method according to an embodiment of the present disclosure.

The following describes a link state packet transmission method in an embodiment of the present disclosure based on the multi-root hierarchical tree structure shown in FIG. 1D. Referring to FIG. 2, FIG. 2 is a schematic flowchart of a link state packet transmission method according to an embodiment of the present disclosure. The method includes but is not limited to the following steps.

S201: A leaf routing node sends its own LSP to an intermediate routing node.

FIG. 1D is used as an example for description. A leaf routing node R1 sends its own LSP to a neighboring intermediate routing node R5 that has a shortest distance to all root routing nodes less than a shortest distance from the leaf routing node R1 to all the root routing nodes, and the intermediate routing node R5 receives the LSP sent by the leaf routing node R1.

It should be noted that each non-root routing node sends its own updated LSP to one or more of a root routing node R8 or a root routing node R9. In this embodiment of the present disclosure, an example in which each non-root routing node sends its own updated LSP to a nearest root routing node in the two root routing nodes is used for description.

Specifically, each non-root routing node monitors its own current link state, and sends an updated LSP to a previous-level routing node in a direction in which a value of a distance toward the root routing node is the smallest. In this embodiment of the present disclosure, an example in which the leaf routing node R1 sends its own LSP to the nearest root routing node R8 is used for description. The leaf routing node R1 determines, based on a distance vector table stored by the leaf routing node R1, that the shortest distance from the leaf routing node R1 to all the root routing nodes is 2. The leaf routing node R1 finds, from the distance vector table, a neighboring routing node that has a shortest distance to all the root routing nodes less than 2, and determines that the neighboring routing node is the intermediate routing node R5 (a shortest distance from R5 to all the root routing nodes is 1), and the leaf routing node R1 sends its own LSP to the intermediate routing node R5.

S202: The intermediate routing node receives the LSP sent by the leaf routing node, and sends the LSP to a root routing node.

Specifically, the intermediate routing node R5 sends the LSP of the leaf routing node R1 to the neighboring root routing node R8 that has a shortest distance to all the root routing nodes less than the shortest distance from the intermediate routing node R5 to all the root routing nodes.

After receiving the LSP sent by the leaf routing node R1, the intermediate routing node R5 determines, based on a distance vector table stored by the intermediate routing node R5, that the shortest distance from the intermediate routing node R5 to all the root routing nodes is 1, then the intermediate routing node R5 finds, from the distance vector table, a neighboring routing node that has a shortest distance to all the root routing nodes less than 1, and determines that the neighboring routing node is the root routing node R8 (a shortest distance from R8 to all the root routing nodes is 0), and the intermediate routing node R5 sends the received LSP of the routing node R1 to the root routing node R8.

S203: The root routing node receives the LSP sent by the intermediate routing node, and aggregates received LSPs to obtain an LSP set.

Specifically, the root routing node R8 receives the LSP of the leaf routing node R1 sent by the intermediate routing node R5, and stores the received LSP of the leaf routing node R1.

It should be noted that another non-root routing node uses a same manner to send its own LSP to a nearest root routing node, for example, the root routing node R8 or the root routing node R9 in this embodiment of the present disclosure. The root routing node R8 and the root routing node R9 are responsible for collecting and storing LSPs of non-root routing nodes, and aggregating all received LSPs.

S204: The root routing node sends the LSP set to the intermediate routing node.

In addition, the root routing node further sends the LSP set to a neighboring root node.

Specifically, each root routing node sends the aggregated LSPs to a next-level routing node in a direction in which a value of a distance toward the root routing node is larger and the neighboring root routing node. The root routing node R8 is used as an example for description. The root routing node R8 determines, based on a distance vector table stored by the root routing node R8, that the shortest distance from the root routing node R8 to all the root routing nodes is 0. The root routing node R8 finds, from the distance vector table, neighboring routing nodes that have shortest distances to all the root routing nodes greater than or equal to 0, and determines that the neighboring routing nodes are the intermediate routing node R5 (the shortest distance from R5 to all the root routing nodes is 1), an intermediate routing node R6 (a shortest distance from R6 to all the root routing nodes is 1), and the root routing node R9 (a shortest distance from R9 to all the root routing nodes is 0), and the root routing node R8 sends LSPs aggregated by the root routing node R8 to the intermediate routing node R5, the intermediate routing node R6, and the neighboring root routing node R9.

S205: The intermediate routing node receives the LSP set sent by the root routing node, and stores the LSP set.

S206: The intermediate routing node sends the LSP set to the leaf routing node.

Specifically, after receiving the aggregated LSPs sent by the root routing node R8, the intermediate routing node R5 stores the received LSPs aggregated by the root routing node R8, and determines, based on the distance vector table stored by the intermediate routing node R5, that the shortest distance from the intermediate routing node R5 to all the root routing nodes is 1. The intermediate routing node R5 finds, from the distance vector table, neighboring routing nodes that have shortest distances to all the root routing nodes greater than 1, and determines that the neighboring routing nodes are the leaf routing node R1 (the shortest distance from R1 to all the root routing nodes is 2) and a leaf routing node R2 (a shortest distance from R2 to all the root routing nodes is 2), and the intermediate routing node R5 sends the LSPs aggregated by the root routing node R8 to the leaf routing node R1 and the leaf routing node R2. The leaf routing node R1 and the leaf routing node R2 receive the aggregated LSPs sent by the intermediate routing node R5, and store the received aggregated LSPs.

After receiving the aggregated LSPs sent by the root routing node R8, the intermediate routing node R6 stores the received LSPs aggregated by the root routing node R8, and determines, based on a distance vector table stored by the intermediate routing node R6, that the shortest distance from the intermediate routing node R6 to all the root routing nodes is 1. The intermediate routing node R6 finds, from the distance vector table, neighboring routing nodes that have shortest distances to all the root routing nodes greater than 1, and determines that the neighboring routing nodes are the leaf routing node R2 (the shortest distance from R2 to all the root routing nodes is 2) and a leaf routing node R3 (a shortest distance from R3 to all the root routing nodes is 2), and the intermediate routing node R6 sends the LSPs aggregated by the root routing node R8 to the leaf routing node R2 and the leaf routing node R3. The leaf routing node R2 and the leaf routing node R3 receive the aggregated LSPs sent by the intermediate routing node R6, and store the received aggregated LSPs.

In addition, after receiving the aggregated LSPs sent by the root routing node R8, the root routing node R9 stores the received LSPs aggregated by the root routing node R8, and determines, based on a distance vector table stored by the root routing node R9, that the shortest distance from the root routing node R9 to all the root routing nodes is 0. The root routing node R9 finds, from the distance vector table, neighboring routing nodes that have shortest distances to all the root routing nodes greater than 0, and determines that the neighboring routing nodes are the intermediate routing node R6 (the shortest distance from R6 to all the root routing nodes is 1) and a leaf routing node R7 (a shortest distance from R7 to all the root routing nodes is 1), and the root routing node R9 sends the LSPs aggregated by the root routing node R8 to the intermediate routing node R6 and the intermediate routing node R7. After receiving the aggregated LSPs sent by the root routing node R9, the intermediate routing node R6 stores the received aggregated LSPs, and determines, based on the distance vector table stored by the intermediate routing node R6, that the shortest distance from the intermediate routing node R6 to all the root routing nodes is 1. The intermediate routing node R6 finds, from the distance vector table, neighboring routing nodes that have shortest distances to all the root routing nodes greater than 1, and determines that the neighboring routing nodes are the leaf routing node R2 (the shortest distance from R2 to all the root routing nodes is 2) and the leaf routing node R3 (the shortest distance from R3 to all the root routing nodes is 2), and the intermediate routing node R6 sends the aggregated LSPs to the leaf routing node R2 and the leaf routing node R3. The leaf routing node R2 and the leaf routing node R3 receive the aggregated LSPs sent by the intermediate routing node R6, and store the received aggregated LSPs.

After receiving the aggregated LSPs sent by the root routing node R9, the intermediate routing node R7 stores the received aggregated LSPs, and determines, based on a distance vector table stored by the intermediate routing node R7, that a shortest distance from the intermediate routing node R7 to all the root routing nodes is 1. The intermediate routing node R7 finds, from the distance vector table, neighboring routing nodes that have shortest distances to all the root routing nodes greater than 1, and determines that the neighboring routing nodes are the leaf routing node R3 (the shortest distance from R3 to all the root routing nodes is 2) and a leaf routing node R4 (a shortest distance from R4 to all the root routing nodes is 2), and the intermediate routing node R7 sends the aggregated LSPs to the leaf routing node R3 and the leaf routing node R4. The leaf routing node R3 and the leaf routing node R4 receive the aggregated LSPs sent by the intermediate routing node R7, and store the received aggregated LSPs.

S207: The leaf routing node receives the LSP set sent by the intermediate routing node, and stores the LSP set.

It should be noted that the intermediate routing node also sends its own LSP to the root routing node, and the root routing node receives the LSP sent by the intermediate routing node.

Likewise, the root routing node R9 also sends the LSPs aggregated by the root routing node R9 to a next-level routing node in a direction in which a distance toward the root routing node is higher and the neighboring root routing node R8, the next-level routing node of the root routing node R9 then sends the LSPs aggregated by R9 to its own next-level routing node, and so on. Finally, all child routing nodes of the root routing node R9 receive the LSPs aggregated by the root routing node R9. The root routing node R8 also sends the LSPs aggregated by the root routing node R9 to its own next-level routing node, and after receiving the LSPs sent by the root routing node R8, the next-level routing node of the root routing node R8 also sends the LSPs to its own next-level routing node. Finally, all child routing nodes of the root routing node R8 receive the LSPs aggregated by the root routing node R9. In this process, the LSPs are transmitted in a tree trunk direction, a ping pong phenomenon can be avoided, and a quantity of LSPs existing in a network can be greatly reduced, thereby avoiding a broadcast storm. In addition, overheads of LSP packet exchange can be reduced, and a link state advertisement (English: Link State Advertising, LSA for short) synchronization speed can be accelerated. The ping pong phenomenon herein means that, when a link state changes, a first router updates its own link state database based on the change, and notifies a second router of updated information (including link information). After updating the information, the second router feeds back integrated information to an initial router, so that a cross update is formed.

All routing nodes can establish a link state database according to the received LSPs aggregated by the root routing node. According to the Shortest Path First algorithm, a shortest path to a destination routing node can be obtained.

According to implementation of this embodiment of the present disclosure, the leaf routing node sends its own link state packet to the intermediate routing node, the intermediate routing node sends the received link state packet to the root routing node, the root routing node aggregates link state packets to obtain the link state packet set, and sends the link state packet set to the intermediate routing node, and the intermediate routing node then sends the received link state packet set to the leaf node. In comparison with a flooding manner, in this embodiment of the present disclosure, a quantity of data link state packets in a network can be reduced, thereby avoiding a broadcast storm.

Because a network has a dynamic property, a network topology may change, and some routing nodes may fail. Therefore, a technical solution in which root routing nodes can be dynamically added or reduced is needed.

Figure 3:
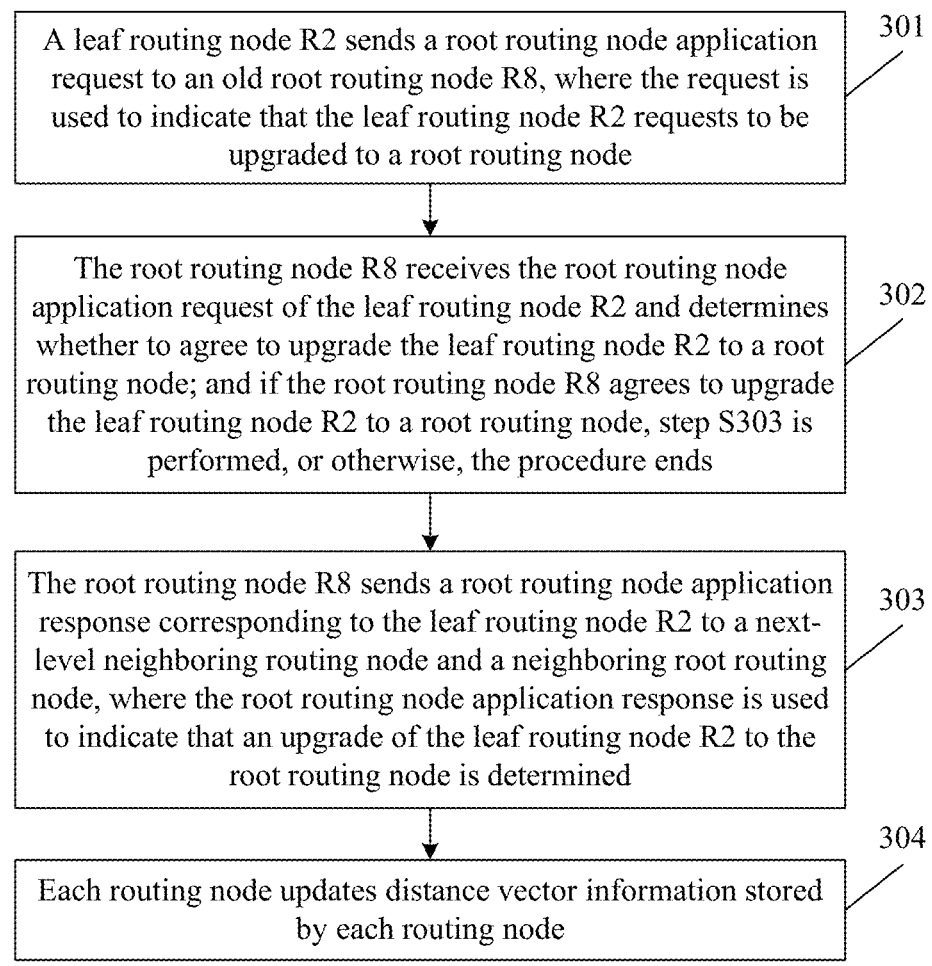
FIG. 3 is a schematic flowchart of an upgrade from a non-root routing node to a root routing node according to an embodiment of the present disclosure.

Referring to FIG. 3, FIG. 3 is a schematic flowchart of an upgrade from a non-root routing node to a root routing node according to an embodiment of the present disclosure. The non-root routing node herein may be a leaf routing node or may be an intermediate routing node. In this embodiment of the present disclosure, an example in which a leaf routing node R2 requests to be upgraded to a root routing node is used for description. The process includes the following steps.

S301: The leaf routing node R2 sends a root routing node application request to an old root routing node R8, where the request is used to indicate that the leaf routing node R2 requests to be upgraded to a root routing node.

Specifically, the non-root routing node monitors a quantity or states of existing root routing nodes and determines whether to become a new root routing node. If a non-root routing node determines to become a new root routing node, the non-root routing node sends a root routing node application request to one or more of old root routing nodes. In this embodiment of the present disclosure, an example in which the non-root routing node sends the root routing node application request to a nearest root routing node is used for description.

The root routing node application request may carry a routing node identifier (which is R2 in this embodiment of the present disclosure) of the leaf routing node R2, to indicate which routing node expects to be upgraded to a root routing node.

The leaf routing node R2 determines, based on a distance vector table stored by the leaf routing node R2, that a shortest distance from the leaf routing node R2 to all root routing nodes is 2. The leaf routing node R2 finds, from the distance vector table, neighboring routing nodes that have shortest distances to all the root routing nodes less than 2, and determines that the neighboring routing nodes are an intermediate routing node R5 (a shortest distance from R5 to all the root routing nodes is 1) and an intermediate routing node R6 (a shortest distance from R6 to all the root routing nodes is 1). In this embodiment of the present disclosure, an example in which the leaf routing node R2 sends the root routing node application request to the intermediate routing node R5 is used for description. The intermediate routing node R5 determines, based on a distance vector table stored by the intermediate routing node R5, that a shortest distance from the intermediate routing node R5 to all the root routing nodes is 1. The intermediate routing node R5 finds, from the distance vector table, a neighboring routing node that has a shortest distance to all the root routing nodes less than 1, and determines that the neighboring routing node is the root routing node R8 (a shortest distance from R8 to all the root routing nodes is 0), and the intermediate routing node R5 forwards the root routing node application request of the leaf routing node R2 to the root routing node R8.

S302: The root routing node R8 receives the root routing node application request of the leaf routing node R2 and determines whether to agree to upgrade the leaf routing node R2 to a root routing node; and if the root routing node R8 agrees to upgrade the leaf routing node R2 to a root routing node, step S303 is performed, or otherwise, the procedure ends.

The root routing node may determine, based on the quantity or the states of the existing root routing nodes, whether to agree to upgrade the leaf routing node R2 to a root routing node. For example, the quantity of the existing root routing nodes is less than a preset threshold 3, and the root routing node R8 agrees to upgrade the leaf routing node R2 to a root routing node. Alternatively, bandwidth of the existing root routing nodes is relatively low, and the root routing node R8 agrees to upgrade the leaf routing node R2 to a root routing node.

S303: The root routing node R8 sends a root routing node application response corresponding to the leaf routing node R2 to a next-level neighboring routing node and a neighboring root routing node, where the root routing node application response is used to indicate that an upgrade of the leaf routing node R2 to a root routing node is determined.

The root routing node application response may carry the identifier of the routing node R2. The root routing node R8 determines, based on a distance vector table stored by the root routing node R8, that the shortest distance from the root routing node R8 to all the root routing nodes is 0. The root routing node R8 finds, from the distance vector table, neighboring routing nodes that have shortest distances to all the root routing nodes greater than or equal to 0, and determines that the neighboring routing nodes are the intermediate routing node R5 (the shortest distance from R5 to all the root routing nodes is 1), the intermediate routing node R6 (the shortest distance from R6 to all the root routing nodes is 1), and a root routing node R9 (a shortest distance from R9 to all the root routing nodes is 0), and the root routing node R8 sends root routing node information corresponding to the leaf routing node R2 to the intermediate routing node R5, the intermediate routing node R6, and the neighboring root routing node R9. Afterwards, the intermediate routing node R5 sends the root routing node information corresponding to the leaf routing node R2 to its own next-level routing nodes (that is, a leaf routing node R1 and the leaf routing node R2), and the intermediate routing node R6 sends the root routing node information corresponding to the leaf routing node R2 to its own next-level routing nodes (that is, the leaf routing node R2 and a leaf routing node R3). Likewise, the root routing node R9 sends the root routing node information corresponding to the leaf routing node R2 to its own next-level routing nodes (that is, the intermediate routing node R6 and an intermediate routing node R7), the intermediate routing node R6 sends the root routing node information corresponding to the leaf routing node R2 to its own next-level routing nodes (that is, the leaf routing node R2 and the leaf routing node R3), and the intermediate routing node R7 sends the root routing node information corresponding to the leaf routing node R2 to its own next-level routing nodes (that is, the leaf routing node R3 and a leaf routing node R4). Finally, each routing node in a hierarchical tree structure receives the root routing node information corresponding to the leaf routing node R2, so as to learn that the leaf routing node R2 is upgraded to a root routing node. After the leaf routing node R2 is upgraded to a root routing node, for a new tree structure, refer to FIG. 4.

S304: Each routing node updates distance vector information stored by each routing node.

In this embodiment of the present disclosure, updated root routing nodes include the root routing node R2, the root routing node R8, and the root routing node R9. Each routing node re-establishes distance vector information to the three root routing nodes, and then updates a distance vector table by using a distance vector advertisement between neighboring routers, so as to update a distance vector table stored by the routing node. For an updated distance vector table, refer to Table 2.

TABLE 2

|  | Shortest distance to a root routing node R2 | Shortest distance to a root routing node R8 | Shortest distance to a root routing node R9 | Shortest distance to all root routing nodes |
|---|---|---|---|---|
| Routing node R1 | 2 | 2 | 3 | 2 |
| Routing node R2 | 0 | 2 | 2 | 0 |
| Routing node R3 | 2 | 2 | 2 | 2 |
| Routing node R4 | 4 | 3 | 2 | 2 |
| Routing node R5 | 1 | 1 | 2 | 1 |
| Routing node R6 | 1 | 1 | 1 | 1 |
| Routing node R7 | 3 | 2 | 1 | 1 |
| Routing node R8 | 2 | 0 | 1 | 0 |
| Routing node R9 | 2 | 1 | 0 | 0 |

According to implementation of this embodiment of the present disclosure, the non-root node may become a root node, so as to implement a dynamic change and adjustment of a root node.

Referring to FIG. 5, FIG. 5 is a schematic flowchart of no longer using a root routing node as a root routing node according to an embodiment of the present disclosure. In the process, an example in which a root routing node R8 is no longer used as a root routing node is used for description. The process includes the following steps.

S501: The root routing node R8 sends a root routing node exit message corresponding to the root routing node R8 to a next-level neighboring routing node and a neighboring root routing node, where the root routing node exit message is used to indicate that the root routing node R8 is no longer used as a root routing node.

Specifically, the root routing node monitors a quantity or states of existing root routing nodes and determines whether to exit from a root routing node set. For example, the quantity of the existing root routing nodes is greater than a preset threshold, and the root routing node R8 determines to exit from the root routing node set. Alternatively, bandwidth of the existing root routing nodes is relatively high, and the root routing node R8 determines to exit from the root routing node set. If the root routing node R8 determines to exit from the root routing node set, the root routing node R8 sends the root routing node exit message to all child routing nodes and the neighboring root routing node. That the root routing node R8 is no longer used as a root routing node includes two cases. In a first case, the root routing node R8 is removed from a tree structure and is no longer used. In a second case, the root routing node R8 is degraded from a root routing node to a non-root routing node.

The root routing node exit message may carry a routing node identifier (which is R8 in this embodiment of the present disclosure) of the root routing node R8, to indicate which routing node expects to exit from the root routing node set.

Figure 6:
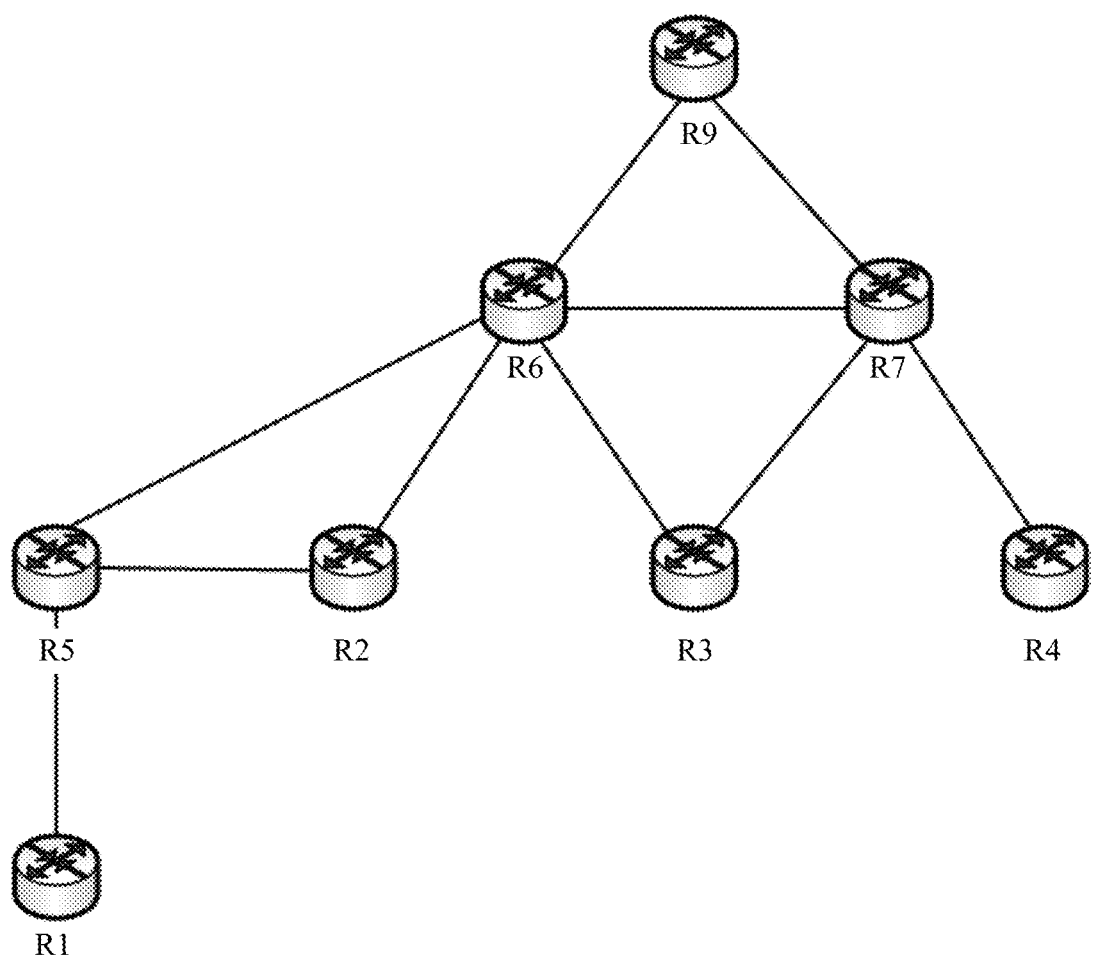
FIG. 6 is a schematic diagram of another tree structure according to an embodiment of the present disclosure.

Specifically, the root routing node R8 determines, based on a distance vector table stored by the root routing node R8, that a shortest distance from the root routing node R8 to all root routing nodes is 0. The root routing node R8 finds, from the distance vector table, neighboring routing nodes that have shortest distances to all the root routing nodes greater than or equal to 0, and determines that the neighboring routing nodes are an intermediate routing node R5 (a shortest distance from R5 to all the root routing nodes is 1), an intermediate routing node R6 (a shortest distance from R6 to all the root routing nodes is 1), and a root routing node R9 (a shortest distance from R9 to all the root routing nodes is 0), and the root routing node R8 sends the root routing node exit message corresponding to the root routing node R8 to the intermediate routing node R5, the intermediate routing node R6, and the neighboring root routing node R9. Afterwards, the intermediate routing node R5 sends the root routing node exit message corresponding to the root routing node R8 to its own next-level routing nodes (that is, a leaf routing node R1 and a leaf routing node R2), and the intermediate routing node R6 sends the root routing node exit message corresponding to the root routing node R8 to its own next-level routing nodes (that is, the leaf routing node R2 and a leaf routing node R3). Likewise, the root routing node R9 sends the root routing node exit message corresponding to the root routing node R8 to its own next-level routing nodes (that is, the intermediate routing node R6 and an intermediate routing node R7), the intermediate routing node R6 sends the root routing node exit message corresponding to the root routing node R8 to its own next-level routing nodes (that is, the leaf routing node R2 and the leaf routing node R3), and the intermediate routing node R7 sends the root routing node exit message corresponding to the root routing node R8 to its own next-level routing nodes (that is, the leaf routing node R3 and a leaf routing node R4). Finally, each routing node in a hierarchical tree structure receives the root routing node exit message corresponding to the root routing node R8, so as to learn that the root routing node R8 is no longer used as a root routing node. Afterwards, the tree structure is adjusted. If the root routing node R8 is no longer used, for a new tree structure, refer to FIG. 6. If the root routing node R8 is degraded to a non-root routing node, for a new tree structure, refer to FIG. 7. A level of each routing node in the updated tree structure is related to a shortest distance from the routing node to all the root routing nodes. For example, in FIG. 6, because the root routing node R8 is no longer used, and a shortest distance from the routing node R5 to the root routing node R9 is 2, the routing node R5 is degraded from a second level to a third level (it is assumed that the root routing node is at a first level).

S502: Each routing node updates distance vector information stored by each routing node.

Figure 7:
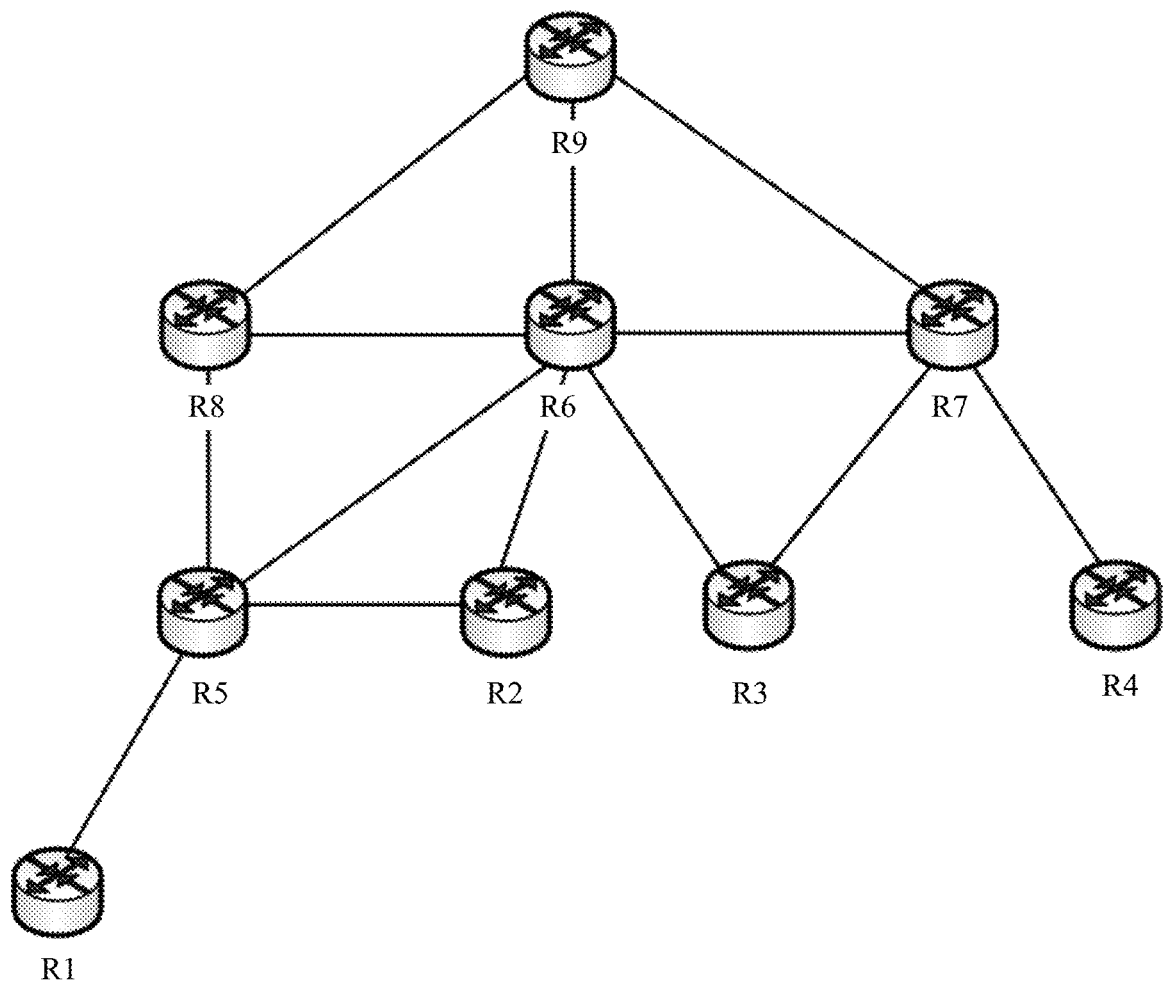
FIG. 7 is a schematic diagram of another tree structure according to an embodiment of the present disclosure.

In this embodiment of the present disclosure, an updated root routing node includes only the root routing node R9. Each routing node re-establishes distance vector information to the root routing node R9, and then updates a distance vector table by using a distance vector advertisement between neighboring routers, so as to update the distance vector table stored by the routing node. The tree structure shown in FIG. 7 is used as an example. For an updated distance vector table, refer to Table 3.

TABLE 3

|  | Shortest distance to a root routing node R9 | Shortest distance to all root routing nodes |
| --- | --- | --- |
| Routing node R1 | 3 | 3 |
| Routing node R2 | 2 | 2 |
| Routing node R3 | 2 | 2 |
| Routing node R4 | 2 | 2 |
| Routing node R5 | 2 | 2 |
| Routing node R6 | 1 | 1 |
| Routing node R7 | 1 | 1 |

TABLE 3-continued

|  | Shortest distance to a root routing node R9 | Shortest distance to all root routing nodes |
| --- | --- | --- |
| Routing node R8 | 1 | 1 |
| Routing node R9 | 0 | 0 |

According to implementation of this embodiment of the present disclosure, the root node may no longer be used as a root node, so as to implement a dynamic change and adjustment of a root node.

Figure 8:
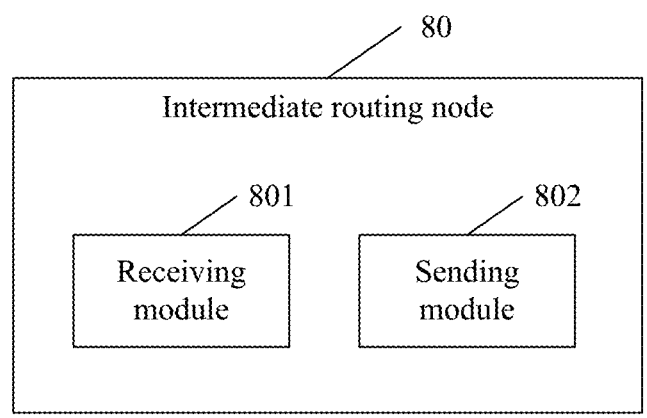
FIG. 8 is a schematic structural diagram of a routing node according to an embodiment of the present disclosure.

FIG. 8 is a schematic structural diagram of a routing node according to an embodiment of the present disclosure. As shown in FIG. 8, an intermediate routing node 80 includes: a receiving module 801 and a sending module 802.

The receiving module 801 is configured to receive a link state packet sent by a child routing node of the intermediate routing node.

The sending module 802 is configured to send the link state packet to the root routing node, where the root routing node is configured to aggregate received link state packets to obtain a link state packet set.

The receiving module 801 is further configured to receive the link state packet set sent by the root routing node.

The sending module 802 is further configured to send the link state packet set to the child routing node of the intermediate routing node.

Optionally, that the sending module 802 is configured to send the link state packet to the root routing node is specifically:

sending, based on first distance vector information, the link state packet to a first neighboring routing node that has a shortest distance to all root routing nodes less than a shortest distance from the intermediate routing node to all the root routing nodes, where the first distance vector information includes the shortest distance from the intermediate routing node to all the root routing nodes and shortest distances separately from all neighboring routing nodes of the intermediate routing node to all the root routing nodes; and if the first neighboring routing node is a root routing node, the first neighboring routing node is configured to receive the link state packet, or if the first neighboring routing node is an intermediate routing node, the first neighboring routing node is configured to send the link state packet to a neighboring routing node that has a shortest distance to all the root routing nodes less than the shortest distance from the first neighboring routing node to all the root routing nodes.

Optionally, the child routing node is a neighboring routing node of the intermediate routing node; and that the sending module 802 is configured to send the link state packet set to the child routing node of the intermediate routing node is specifically:

sending, based on the first distance vector information, the link state packet set to a second neighboring routing node that has a shortest distance to all the root routing nodes greater than the shortest distance from the intermediate routing node to all the root routing nodes, where the first distance vector information includes the shortest distance from the intermediate routing node to all the root routing nodes and the shortest distances separately from all the neighboring routing nodes of the intermediate routing node to all the root routing nodes; and if the second neighboring routing node is a leaf routing node, the second neighboring routing node is configured to receive the link state packet set, or if the second neighboring routing node is an intermediate routing node, the second neighboring routing node is configured to send the link state packet set to a neighboring routing node that has a shortest distance to all the root routing nodes greater than the shortest distance from the second neighboring routing node to all the root routing nodes.

Optionally, the receiving module 801 is further configured to receive indication information before receiving the link state packet sent by the child routing node of the intermediate routing node, where the indication information is used to indicate which routing nodes are used as the root routing nodes.

The intermediate routing node 80 further includes: a determining module, configured to determine, based on a routing vector routing algorithm, the shortest distance from the intermediate routing node to all the root routing nodes and the shortest distances separately from all the neighboring routing nodes of the intermediate routing node to all the root routing nodes, and generate the first distance vector information based on the shortest distance from the intermediate routing node to all the root routing nodes and the shortest distances separately from all the neighboring routing nodes of the intermediate routing node to all the root routing nodes.

Optionally, the sending module 802 is further configured to: when it is determined that a first preset condition is met, send a root routing node application request to one or more root routing nodes in all the root routing nodes, where the root routing node application request is used to indicate that the intermediate routing node requests to be upgraded to a root routing node; and if the intermediate routing node receives a root routing node application response sent by the one or more root routing nodes, the intermediate routing node updates the first distance vector information, where the root routing node application response is used to indicate that the intermediate routing node has been upgraded to a root routing node.

Figure 9:
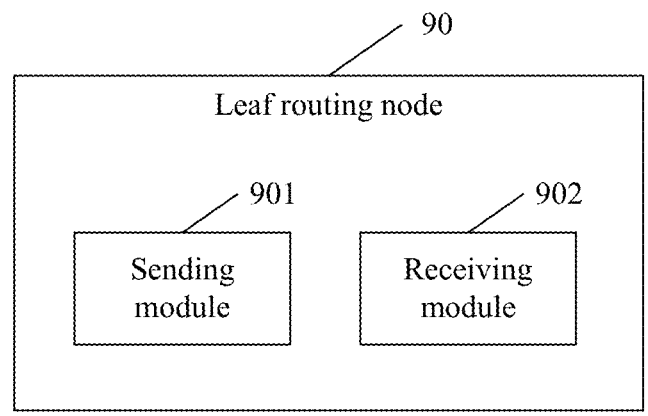
FIG. 9 is a schematic structural diagram of another routing node according to an embodiment of the present disclosure.

FIG. 9 is a schematic structural diagram of a routing node according to an embodiment of the present disclosure. As shown in FIG. 9, a leaf routing node 90 includes: a sending module 901 and a receiving module 902.

The sending module 901 is configured to send its own link state packet to the intermediate routing node, where the intermediate routing node is configured to send the link state packet to the root routing node, and the root routing node is configured to aggregate received link state packets to obtain a link state packet set.

The receiving module 902 is configured to receive the link state packet set sent by the intermediate routing node.

Optionally, the intermediate routing node is a neighboring routing node of the leaf routing node; and that the sending module 901 is configured to send its own link state packet to the intermediate routing node is specifically: sending, based on second distance vector information, the link state packet to a neighboring routing node that has a shortest distance to all root routing nodes less than a shortest distance from the leaf routing node to all the root routing nodes, where the second distance vector information includes the shortest distance from the leaf routing node to all the root routing nodes and shortest distances separately from all neighboring routing nodes of the leaf routing node to all the root routing nodes; and if the neighboring routing node is a root routing node, the neighboring routing node is configured to receive the link state packet, or if the neighboring routing node is an intermediate routing node, the neighboring routing node is configured to send the link state packet to a neighboring routing node that has a shortest distance to all the root routing nodes less than the shortest distance from the neighboring routing node to all the root routing nodes.

Optionally, the receiving module 902 is further configured to receive indication information before the sending module sends its own link state packet to the intermediate routing node, where the indication information is used to indicate which routing nodes are used as the root routing nodes.

The leaf routing node 90 further includes: a determining module, configured to determine, based on a routing vector routing algorithm, the shortest distance from the leaf routing node to all the root routing nodes and the shortest distances separately from all the neighboring routing nodes of the leaf routing node to all the root routing nodes, and generate the second distance vector information based on the shortest distance from the leaf routing node to all the root routing nodes and the shortest distances separately from all the neighboring routing nodes of the leaf routing node to all the root routing nodes.

Optionally, the sending module 901 is further configured to: when it is determined that a first preset condition is met, send a root routing node application request to one or more root routing nodes in all the root routing nodes, where the root routing node application request is used to indicate that the leaf routing node requests to be upgraded to a root routing node.

The leaf routing node 90 further includes: an updating module, configured to: if the receiving module receives a root routing node application response sent by the one or more root routing nodes, update the second distance vector information, where the root routing node application response is used to indicate that the leaf routing node has been upgraded to a root routing node.

Figure 10:
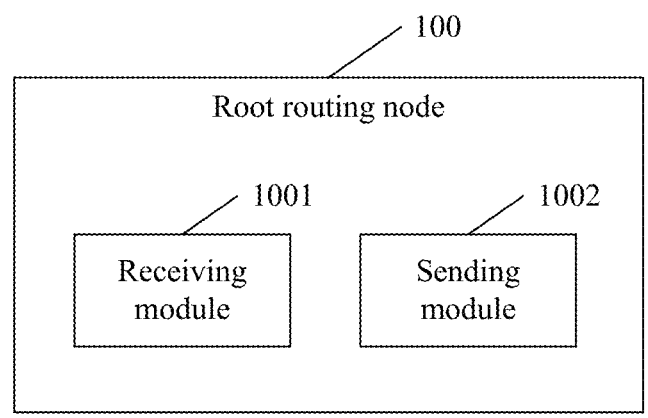
FIG. 10 is a schematic structural diagram of another routing node according to an embodiment of the present disclosure.

FIG. 10 is a schematic structural diagram of a routing node according to an embodiment of the present disclosure. As shown in FIG. 10, a root routing node 100 includes: a receiving module 1001 and a sending module 1002.

The receiving module 1001 is configured to receive a link state packet sent by the intermediate routing node, and aggregate received link state packets to obtain a link state packet set.

The sending module 1002 is configured to send the link state packet set to the intermediate routing node and a neighboring root routing node, where the intermediate routing node is configured to send the link state packet set to the leaf routing node, and the neighboring root routing node is configured to send the link state packet to a child routing node of the neighboring root routing node.

Optionally, that the sending module 1002 is configured to send the link state packet set to the intermediate routing node and the neighboring root routing node is specifically:

sending, based on third distance vector information, the link state packet set to a neighboring routing node that has a shortest distance to all root routing nodes greater than or equal to a shortest distance from the root routing node to all the root routing nodes, where the third distance vector information includes the shortest distance from the root routing node to all the root routing nodes and shortest distances separately from all neighboring routing nodes of the root routing node to all the root routing nodes; and if the neighboring routing node is a leaf routing node, the neighboring routing node is configured to receive the link state packet set, or if the neighboring routing node is an intermediate routing node, the neighboring routing node is configured to send the link state packet set to a neighboring routing node that has a shortest distance to all the root routing nodes greater than the shortest distance from the neighboring routing node to all the root routing nodes.

Optionally, the receiving module 1001 is further configured to receive indication information before receiving the link state packet sent by the intermediate routing node, where the indication information is used to indicate which routing nodes are used as the root routing nodes.

The root routing node 100 further includes: a determining module, configured to determine, based on a routing vector routing algorithm, the shortest distance from the root routing node to all the root routing nodes and the shortest distances separately from all the neighboring routing nodes of the root routing node to all the root routing nodes, and generate the third distance vector information based on the shortest distance from the root routing node to all the root routing nodes and the shortest distances separately from all the neighboring routing nodes of the root routing node to all the root routing nodes.

Optionally, the receiving module 1001 is further configured to receive a root routing node application request sent by the intermediate routing node or the leaf routing node, where the root routing node application request is used to indicate that the intermediate routing node or the leaf routing node requests to be upgraded to a root routing node.

The sending module 1002 is further configured to: if the root routing node determines that the intermediate routing node or the leaf routing node can be upgraded to a root routing node, send a root routing node application response to the intermediate routing node or the leaf routing node, where the root routing node application response is used to indicate that the intermediate routing node or the leaf routing node has been upgraded to a root routing node.

Optionally, the sending module 1002 is further configured to: when it is determined that a second preset condition is met, send a root routing node exit message to a child routing node of the root routing node, where the root routing node exit message is used to indicate that the root routing node is no longer used as a root routing node.

Figure 11:
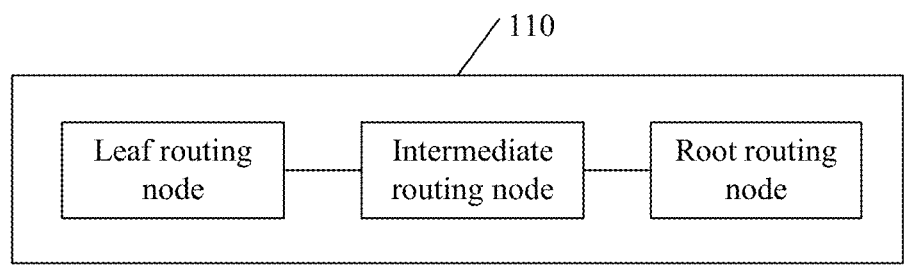
FIG. 11 is a schematic structural diagram of a network system according to an embodiment of the present disclosure.

FIG. 11 is a schematic structural diagram of a network system according to an embodiment of the present disclosure. As shown in FIG. 11, the system may include the intermediate routing node in the embodiment of FIG. 8 and the leaf routing node in the embodiment of FIG. 9; or may include the intermediate routing node in the embodiment of FIG. 8 and the root routing node in the embodiment of FIG. 10; or may include the intermediate routing node in the embodiment of FIG. 8, the leaf routing node in the embodiment of FIG. 9, and the root routing node in the embodiment of FIG. 10. In this embodiment of the present disclosure, an example in which the system 110 includes an intermediate routing node, a leaf routing node, and a root routing node is used for description. For the intermediate routing node, refer to related description in the embodiment of FIG. 8. For the leaf routing node, refer to related description in the embodiment of FIG. 9. For the root routing node, refer to related description in the embodiment of FIG. 10. Details are not described herein again.

Figure 12:
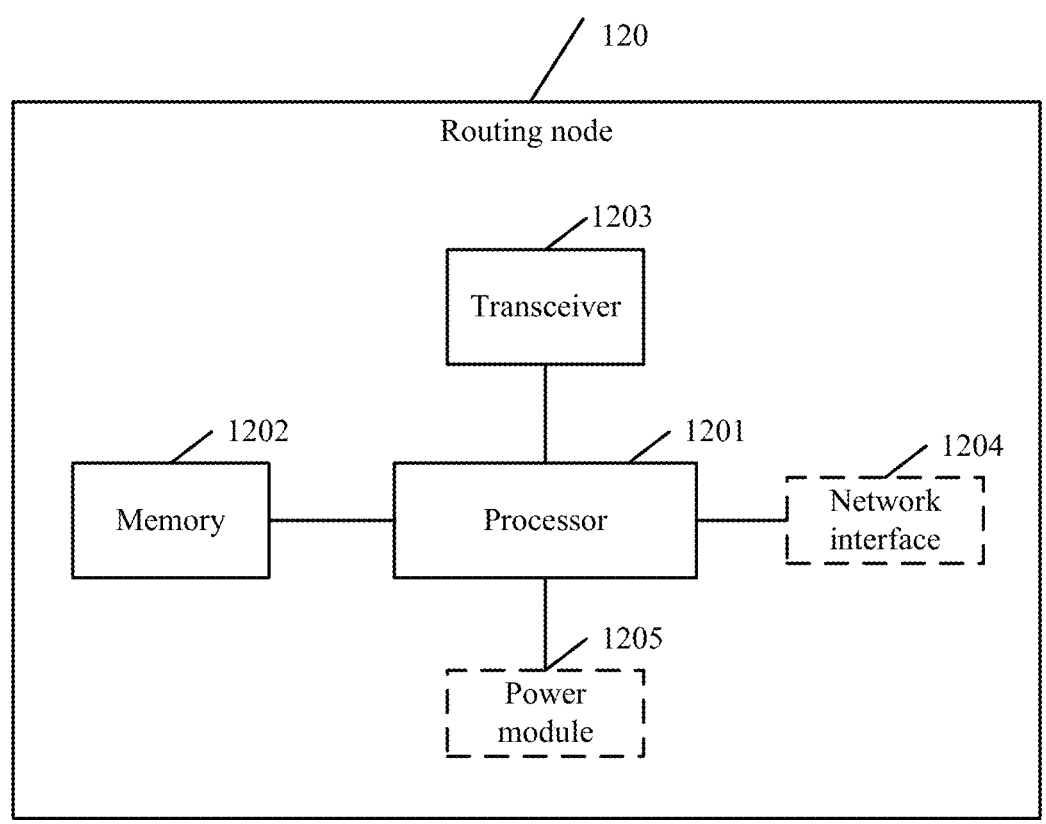
FIG. 12 is a schematic structural diagram of another routing node according to an embodiment of the present disclosure.

Referring to FIG. 12, FIG. 12 is a schematic structural diagram of a routing node according to an embodiment of the present disclosure. As shown in FIG. 12, the routing node 120 includes a processor 1201, a memory 1202, and a transceiver 1203. The processor 1201, the memory 1202, and the transceiver 1203 may be connected by using a bus or in another manner.

Optionally, the routing node 120 may further include a network interface 1204 and a power module 1205.

The memory 1202 is configured to store an instruction. In specific implementation, the memory 1202 may be a read-only memory (English: Read-Only Memory, ROM for short) or a random access memory (English: Random Access Memory, RAM for short).

The transceiver 1203 is configured to receive and send data.

The network interface 1204 is configured to perform communication between the routing node 120 and another device.

The power module 1205 is configured to supply power to each module of the routing node 120.

In a first implementation of this embodiment of the present disclosure, the processor 1201 is configured to perform the following operations:

receiving, by using the transceiver 1203, a link state packet sent by a child routing node of the intermediate routing node;

sending the link state packet to the root routing node by using the transceiver 1203, where the root routing node is configured to aggregate received link state packets to obtain a link state packet set;

receiving, by using the transceiver 1203, the link state packet set sent by the root routing node; and sending the link state packet set to the child routing node of the intermediate routing node by using the transceiver 1203.

Optionally, that the processor 1201 sends the link state packet to the root routing node by using the transceiver 1203 includes:

sending, by using the transceiver 1203 based on first distance vector information, the link state packet to a first neighboring routing node that has a shortest distance to all root routing nodes less than a shortest distance from the intermediate routing node to all the root routing nodes, where the first distance vector information includes the shortest distance from the intermediate routing node to all the root routing nodes and shortest distances separately from all neighboring routing nodes of the intermediate routing node to all the root routing nodes; and if the first neighboring routing node is a root routing node, the first neighboring routing node is configured to receive the link state packet, or if the first neighboring routing node is an intermediate routing node, the first neighboring routing node is configured to send the link state packet to a neighboring routing node that has a shortest distance to all the root routing nodes less than the shortest distance from the first neighboring routing node to all the root routing nodes.

Optionally, the child routing node is a neighboring routing node of the intermediate routing node; and that the processor 1201 sends the link state packet set to the child routing node of the intermediate routing node by using the transceiver 1203 includes:

sending, by using the transceiver 1203 based on the first distance vector information, the link state packet set to a second neighboring routing node that has a shortest distance to all the root routing nodes greater than the shortest distance from the intermediate routing node to all the root routing nodes, where the first distance vector information includes the shortest distance from the intermediate routing node to all the root routing nodes and the shortest distances separately from all the neighboring routing nodes of the intermediate routing node to all the root routing nodes; and if the second neighboring routing node is a leaf routing node, the second neighboring routing node is configured to receive the link state packet set, or if the second neighboring routing node is an intermediate routing node, the second neighboring routing node is configured to send the link state packet set to a neighboring routing node that has a shortest distance to all the root routing nodes greater than the shortest distance from the second neighboring routing node to all the root routing nodes.

Optionally, before the processor 1201 receives, by using the transceiver 1203, the link state packet sent by the child routing node of the intermediate routing node, the processor 1201 is further configured to:

receive indication information by using the transceiver 1203, where the indication information is used to indicate which routing nodes are used as the root routing nodes; and determine, based on a routing vector routing algorithm, the shortest distance from the intermediate routing node to all the root routing nodes and the shortest distances separately from all the neighboring routing nodes of the intermediate routing node to all the root routing nodes, and generate the first distance vector information based on the shortest distance from the intermediate routing node to all the root routing nodes and the shortest distances separately from all the neighboring routing nodes of the intermediate routing node to all the root routing nodes.

Optionally, the processor 1201 is further configured to:

when it is determined that a first preset condition is met, send a root routing node application request to one or more root routing nodes in all the root routing nodes by using the transceiver 1203, where the root routing node application request is used to indicate that the intermediate routing node requests to be upgraded to a root routing node; and if the intermediate routing node receives a root routing node application response sent by the one or more root routing nodes, update the first distance vector information by the intermediate routing node, where the root routing node application response is used to indicate that the intermediate routing node has been upgraded to a root routing node.

In a second implementation of this embodiment of the present disclosure, the processor 1201 is configured to perform the following operations:

sending its own link state packet to the intermediate routing node by using the transceiver 1203, where the intermediate routing node is configured to send the link state packet to the root routing node, and the root routing node is configured to aggregate received link state packets to obtain a link state packet set; and receiving, by using the transceiver 1203, the link state packet set sent by the intermediate routing node.

Optionally, the intermediate routing node is a neighboring routing node of the leaf routing node; and that the processor 1201 sends its own link state packet to the intermediate routing node by using the transceiver 1203 includes:

sending, by using the transceiver 1203 based on second distance vector information, the link state packet to a neighboring routing node that has a shortest distance to all root routing nodes less than a shortest distance from the leaf routing node to all the root routing nodes, where the second distance vector information includes the shortest distance from the leaf routing node to all the root routing nodes and shortest distances separately from all neighboring routing nodes of the leaf routing node to all the root routing nodes; and if the neighboring routing node is a root routing node, the neighboring routing node is configured to receive the link state packet, or if the neighboring routing node is an intermediate routing node, the neighboring routing node is configured to send the link state packet to a neighboring routing node that has a shortest distance to all the root routing nodes less than the shortest distance from the neighboring routing node to all the root routing nodes.

Optionally, before the processor 1201 sends its own link state packet to the intermediate routing node by using the transceiver 1203, the processor 1201 is further configured to:

receive indication information by using the transceiver 1203, where the indication information is used to indicate which routing nodes are used as the root routing nodes; and determine, based on a routing vector routing algorithm, the shortest distance from the leaf routing node to all the root routing nodes and the shortest distances separately from all the neighboring routing nodes of the leaf routing node to all the root routing nodes, and generate the second distance vector information based on the shortest distance from the leaf routing node to all the root routing nodes and the shortest distances separately from all the neighboring routing nodes of the leaf routing node to all the root routing nodes.

Optionally, the processor 1201 is further configured to:

when it is determined that a first preset condition is met, send a root routing node application request to one or more root routing nodes in all the root routing nodes by using the transceiver 1203, where the root routing node application request is used to indicate that the leaf routing node requests to be upgraded to a root routing node; and if the leaf routing node receives a root routing node application response sent by the one or more root routing nodes, update the second distance vector information, where the root routing node application response is used to indicate that the leaf routing node has been upgraded to a root routing node.

In a third implementation of this embodiment of the present disclosure, the processor 1201 is configured to perform the following operations:

receiving, by using the transceiver 1203, a link state packet sent by the intermediate routing node, and aggregating received link state packets to obtain a link state packet set; and sending the link state packet set to the intermediate routing node and a neighboring root routing node by using the transceiver 1203, where the intermediate routing node is configured to send the link state packet set to the leaf routing node, and the neighboring root routing node is configured to send the link state packet to a child routing node of the neighboring root routing node.

Optionally, that the processor 1201 sends the link state packet set to the intermediate routing node and the neighboring root routing node by using the transceiver 1203 includes:

sending, by using the transceiver 1203 based on third distance vector information, the link state packet set to a neighboring routing node that has a shortest distance to all root routing nodes greater than or equal to a shortest distance from the root routing node to all the root routing nodes, where the third distance vector information includes the shortest distance from the root routing node to all the root routing nodes and shortest distances separately from all neighboring routing nodes of the root routing node to all the root routing nodes; and if the neighboring routing node is a leaf routing node, the neighboring routing node is configured to receive the link state packet set, or if the neighboring routing node is an intermediate routing node, the neighboring routing node is configured to send the link state packet set to a neighboring routing node that has a shortest distance to all the root routing nodes greater than the shortest distance from the neighboring routing node to all the root routing nodes.

Optionally, before the processor 1201 receives, by using the transceiver 1203, the link state packet sent by the intermediate routing node, the processor 1201 is further configured to:

receive indication information by using the transceiver 1203, where the indication information is used to indicate which routing nodes are used as the root routing nodes; and determine, based on a routing vector routing algorithm, the shortest distance from the root routing node to all the root routing nodes and the shortest distances separately from all the neighboring routing nodes of the root routing node to all the root routing nodes, and generate the third distance vector information based on the shortest distance from the root routing node to all the root routing nodes and the shortest distances separately from all the neighboring routing nodes of the root routing node to all the root routing nodes.

Optionally, the processor 1201 is further configured to:

receive, by using the transceiver 1203, a root routing node application request sent by the intermediate routing node or the leaf routing node, where the root routing node application request is used to indicate that the intermediate routing node or the leaf routing node requests to be upgraded to a root routing node; and if it is determined that the intermediate routing node or the leaf routing node can be upgraded to a root routing node, send a root routing node application response to the intermediate routing node or the leaf routing node by using the transceiver 1203, where the root routing node application response is used to indicate that the intermediate routing node or the leaf routing node has been upgraded to a root routing node.

Optionally, the processor 1201 is further configured to:

when it is determined that a second preset condition is met, send a root routing node exit message to a child routing node of the root routing node by using the transceiver 1203, where the root routing node exit message is used to indicate that the root routing node is no longer used as a root routing node.

A person of ordinary skill in the art may understand that, each aspect of the embodiments of the present disclosure or a possible implementation of each aspect may be specifically implemented as a system, a method, or a computer program product. Therefore, each aspect of the embodiments of the present disclosure or the possible implementation of each aspect may use forms of hardware only embodiments, software only embodiments (including firmware, resident software, and the like), or embodiments with a combination of software and hardware, which are uniformly referred to as a "circuit", "module", or "system" herein. In addition, each aspect of the embodiments of the present disclosure or the possible implementation of each aspect may take a form of a computer program product, where the computer program product is computer-readable program code stored in a computer-readable medium.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

What is claimed is:

1. A link state packet transmission method, wherein the method is applied to a tree topology, and the tree topology comprises a leaf routing node, an intermediate routing node, and a root routing node, and the method comprises:

receiving, by the intermediate routing node, a link state packet sent by a child routing node of the intermediate routing node;

sending, by the intermediate routing node, the link state packet to the root routing node, wherein the root routing node is configured to aggregate received link state packets to obtain a link state packet set;

receiving, by the intermediate routing node, the link state packet set sent by the root routing node; and sending, by the intermediate routing node, the link state packet set to the child routing node of the intermediate routing node, wherein the sending, by the intermediate routing node, the link state packet to the root routing node comprises:

sending, by the intermediate routing node based on first distance vector information, the link state packet to a first neighboring routing node that has a shortest distance to all root routing nodes less than a shortest distance from the intermediate routing node to all the root routing nodes.

2. The method according to claim 1, wherein the first distance vector information comprises the shortest distance from the intermediate routing node to all the root routing nodes and shortest distances separately from all neighboring routing nodes of the intermediate routing node to all the root routing nodes; and wherein:

when the first neighboring routing node is a root routing node, the first neighboring routing node is configured to receive the link state packet, or when the first neighboring routing node is an intermediate routing node, the first neighboring routing node is configured to send the link state packet to a neighboring routing node that has a shortest distance to all the root routing nodes less than the shortest distance from the first neighboring routing node to all the root routing nodes.

3. The method according to claim 1, wherein the child routing node is a neighboring routing node of the intermediate routing node; and wherein the sending, by the intermediate routing node, the link state packet set to the child routing node of the intermediate routing node comprises:

sending, by the intermediate routing node based on the first distance vector information, the link state packet set to a second neighboring routing node that has a shortest distance to all the root routing nodes greater than the shortest distance from the intermediate routing node to all the root routing nodes, wherein the first distance vector information comprises the shortest distance from the intermediate routing node to all the root routing nodes and the shortest distances separately from all the neighboring routing nodes of the intermediate routing node to all the root routing nodes; and wherein:
when the second neighboring routing node is a leaf routing node, the second neighboring routing node is configured to receive the link state packet set, or
when the second neighboring routing node is an intermediate routing node, the second neighboring routing node is configured to send the link state packet set to a neighboring routing node that has a shortest distance to all the root routing nodes greater than the shortest distance from the second neighboring routing node to all the root routing nodes.

4. The method according to claim 1, wherein before the receiving, by the intermediate routing node, a link state packet sent by a child routing node of the intermediate routing node, the method further comprises:
receiving, by the intermediate routing node, indication information, wherein the indication information is used to indicate which routing nodes are used as the root routing nodes;
determining, by the intermediate routing node based on a routing vector routing algorithm, the shortest distance from the intermediate routing node to all the root routing nodes and the shortest distances separately from all the neighboring routing nodes of the intermediate routing node to all the root routing nodes; and
generating, by the intermediate routing node, the first distance vector information based on the shortest distance from the intermediate routing node to all the root routing nodes and the shortest distances separately from all the neighboring routing nodes of the intermediate routing node to all the root routing nodes.

5. The method according to claim 1, further comprising:
when it is determined that a first preset condition is met, sending, by the intermediate routing node, a root routing node application request to one or more root routing nodes in all the root routing nodes, wherein the root routing node application request is used to indicate that the intermediate routing node requests to be upgraded to a root routing node; and
when the intermediate routing node receives a root routing node application response sent by the one or more root routing nodes, updating, by the intermediate routing node, the first distance vector information, wherein the root routing node application response is used to indicate that the intermediate routing node has been upgraded to a root routing node.

6. A link state packet transmission method, wherein the method is applied to a tree topology, and the tree topology comprises a leaf routing node, an intermediate routing node, and a root routing node, and the method comprises:
sending, by the leaf routing node, its own link state packet to the intermediate routing node, wherein the intermediate routing node is configured to send the link state packet to the root routing node, and the root routing node is configured to aggregate received link state packets to obtain a link state packet set; and
receiving, by the leaf routing node, the link state packet set sent by the intermediate routing node,
wherein the sending, by the leaf routing node, its own link state packet to the intermediate routing node comprises:
sending, by the leaf routing node based on second distance vector information, the link state packet to a neighboring routing node that has a shortest distance to all root routing nodes less than a shortest distance from the leaf routing node to all the root routing nodes.

7. The method according to claim 6, wherein the intermediate routing node is a neighboring routing node of the leaf routing node; and
wherein the second distance vector information comprises the shortest distance from the leaf routing node to all the root routing nodes and shortest distances separately from all neighboring routing nodes of the leaf routing node to all the root routing nodes; and
wherein:
when the neighboring routing node is a root routing node, the neighboring routing node is configured to receive the link state packet, or
when the neighboring routing node is an intermediate routing node, the neighboring routing node is configured to send the link state packet to a neighboring routing node that has a shortest distance to all the root routing nodes less than the shortest distance from the neighboring routing node to all the root routing nodes.

8. The method according to claim 6, wherein before the sending, by the leaf routing node, its own link state packet to the intermediate routing node, the method further comprises:
receiving, by the leaf routing node, indication information, wherein the indication information is used to indicate which routing nodes are used as the root routing nodes;
determining, by the leaf routing node based on a routing vector routing algorithm, the shortest distance from the leaf routing node to all the root routing nodes and the shortest distances separately from all the neighboring routing nodes of the leaf routing node to all the root routing nodes; and
generating, by the leaf routing node, the second distance vector information based on the shortest distance from the leaf routing node to all the root routing nodes and the shortest distances separately from all the neighboring routing nodes of the leaf routing node to all the root routing nodes.

9. The method according to claim 6, further comprising:
when it is determined that a first preset condition is met, sending, by the leaf routing node, a root routing node application request to one or more root routing nodes in all the root routing nodes, wherein the root routing node application request is used to indicate that the leaf routing node requests to be upgraded to a root routing node; and
when the leaf routing node receives a root routing node application response sent by the one or more root routing nodes, updating, by the leaf routing node, the second distance vector information, wherein the root routing node application response is used to indicate that the leaf routing node has been upgraded to a root routing node.

10. A link state packet transmission method, wherein the method is applied to a tree topology, and the tree topology comprises a leaf routing node, an intermediate routing node, and a root routing node, and the method comprises:
receiving, by the root routing node, a link state packet sent by the intermediate routing node;
aggregating, by the root routing node, received link state packets to obtain a link state packet set; and
sending, by the root routing node, the link state packet set to the intermediate routing node and a neighboring root routing node, wherein the intermediate routing node is configured to send the link state packet set to the leaf routing node, and the neighboring root routing node is configured to send the link state packet to a child routing node of the neighboring root routing node, wherein the sending, by the root routing node, the link state packet set to the intermediate routing node and the neighboring root routing node comprises:

sending, by the root routing node based on third distance vector information, the link state packet set to a neighboring routing node that has a shortest distance to all root routing nodes greater than or equal to a shortest distance from the root routing node to all the root routing nodes.

11. The method according to claim 10, wherein the third distance vector information comprises the shortest distance from the root routing node to all the root routing nodes and shortest distances separately from all neighboring routing nodes of the root routing node to all the root routing nodes; and wherein:

when the neighboring routing node is a leaf routing node, the neighboring routing node is configured to receive the link state packet set, or when the neighboring routing node is an intermediate routing node, the neighboring routing node is configured to send the link state packet set to a neighboring routing node that has a shortest distance to all the root routing nodes greater than the shortest distance from the neighboring routing node to all the root routing nodes.

12. The method according to claim 10, wherein, before the receiving, by the root routing node, the link state packet sent by the intermediate routing node, the method further comprises:

receiving, by the root routing node, indication information, wherein the indication information is used to indicate which routing nodes are used as the root routing nodes;

determining, by the root routing node based on a routing vector routing algorithm, the shortest distance from the root routing node to all the root routing nodes and the shortest distances separately from all the neighboring routing nodes of the root routing node to all the root routing nodes; and generating, by the root routing node, the third distance vector information based on the shortest distance from the root routing node to all the root routing nodes and the shortest distances separately from all the neighboring routing nodes of the root routing node to all the root routing nodes.

13. The method according to claim 10, further comprising:

receiving, by the root routing node, a root routing node application request sent by the intermediate routing node or the leaf routing node, wherein the root routing node application request is used to indicate that the intermediate routing node or the leaf routing node requests to be upgraded to a root routing node; and when the root routing node determines that the intermediate routing node or the leaf routing node can be upgraded to a root routing node, sending, by the root routing node, a root routing node application response to the intermediate routing node or the leaf routing node, wherein the root routing node application response is used to indicate that the intermediate routing node or the leaf routing node has been upgraded to a root routing node.

14. The method according to claim 10, further comprising:

when it is determined that a second preset condition is met, sending, by the root routing node, a root routing node exit message to a child routing node of the root routing node, wherein the root routing node exit message is used to indicate that the root routing node is no longer used as a root routing node.

15. An intermediate routing node for performing link state packet transmission within a tree topology, and the tree topology comprises a leaf routing node, the intermediate routing node, and a root routing node, the intermediate routing node comprises:

a processor; and a memory coupled to the processor and storing instructions that when executed configure the processor to perform steps comprising:

receiving a link state packet sent by a child routing node of the intermediate routing node;

sending the link state packet to the root routing node, wherein the root routing node is configured to aggregate received link state packets to obtain a link state packet set;

receiving the link state packet set sent by the root routing node; and sending the link state packet set to the child routing node of the intermediate routing node, wherein the sending the link state packet to the root routing node comprises:

sending, based on first distance vector information, the link state packet to a first neighboring routing node that has a shortest distance to all root routing nodes less than a shortest distance from the intermediate routing node to all the root routing nodes.

16. The intermediate routing node according to claim 15, wherein the first distance vector information comprises the shortest distance from the intermediate routing node to all the root routing nodes and shortest distances separately from all neighboring routing nodes of the intermediate routing node to all the root routing nodes; and wherein:

when the first neighboring routing node is a root routing node, the first neighboring routing node is configured to receive the link state packet, or when the first neighboring routing node is an intermediate routing node, the first neighboring routing node is configured to send the link state packet to a neighboring routing node that has a shortest distance to all the root routing nodes less than the shortest distance from the first neighboring routing node to all the root routing nodes.

17. The intermediate routing node according to claim 15, wherein the child routing node is a neighboring routing node of the intermediate routing node; and wherein the sending the link state packet set to the child routing node of the intermediate routing node comprises:

sending, based on the first distance vector information, the link state packet set to a second neighboring routing node that has a shortest distance to all the root routing nodes greater than the shortest distance from the intermediate routing node to all the root routing nodes, wherein the first distance vector information comprises the shortest distance from the intermediate routing node to all the root routing nodes and the shortest distances separately from all the neighboring routing nodes of the intermediate routing node to all the root routing nodes; and wherein:
when the second neighboring routing node is a leaf routing node, the second neighboring routing node is configured to receive the link state packet set, or
when the second neighboring routing node is an intermediate routing node, the second neighboring routing node is configured to send the link state packet set to a neighboring routing node that has a shortest distance to all the root routing nodes greater than the shortest distance from the second neighboring routing node to all the root routing nodes.

18. A root routing node for performing link state packet transmission within a tree topology, and the tree topology comprises a leaf routing node, an intermediate routing node, and the root routing node, the root routing node comprises:
a processor; and
a memory coupled to the processor and storing instructions that when executed configure the processor to perform steps comprising:
receiving a link state packet sent by the intermediate routing node;
aggregating received link state packets to obtain a link state packet set; and
sending the link state packet set to the intermediate routing node and a neighboring root routing node, wherein the intermediate routing node is configured to send the link state packet set to the leaf routing node, and the neighboring root routing node is configured to send the link state packet to a child routing node of the neighboring root routing node,
wherein the sending the link state packet set to the intermediate routing node and the neighboring root routing node comprises:
sending, based on third distance vector information, the link state packet set to a neighboring routing node that has a shortest distance to all root routing nodes greater than or equal to a shortest distance from the root routing node to all the root routing nodes.

19. The root routing node according to claim 18,
wherein the third distance vector information comprises the shortest distance from the root routing node to all the root routing nodes and shortest distances separately from all neighboring routing nodes of the root routing node to all the root routing nodes; and
wherein:
when the neighboring routing node is a leaf routing node, the neighboring routing node is configured to receive the link state packet set, or
when the neighboring routing node is an intermediate routing node, the neighboring routing node is configured to send the link state packet set to a neighboring routing node that has a shortest distance to all the root routing nodes greater than the shortest distance from the neighboring routing node to all the root routing nodes.

20. The root routing node according to claim 18, wherein, before the receiving the link state packet sent by the intermediate routing node, the processor is further configured to perform steps comprising:
receiving, by the root routing node, indication information, wherein the indication information is used to indicate which routing nodes are used as the root routing nodes;
determining, by the root routing node based on a routing vector routing algorithm, the shortest distance from the root routing node to all the root routing nodes and the shortest distances separately from all the neighboring routing nodes of the root routing node to all the root routing nodes; and
generating, by the root routing node, the third distance vector information based on the shortest distance from the root routing node to all the root routing nodes and the shortest distances separately from all the neighboring routing nodes of the root routing node to all the root routing nodes.

* * * * *

UNITED STATES PATENT AND TRADEMARK OFFICE
CERTIFICATE OF CORRECTION

PATENT NO. : 10,972,310 B2  
APPLICATION NO. : 16/414425  
DATED : April 6, 2021  
INVENTOR(S) : Lin et al.

Page 1 of 1

It is certified that error appears in the above-identified patent and that said Letters Patent is hereby corrected as shown below:

On the Title Page

Page 2, Item (56) Other Publications, Citation 2: "Kormaz et al.," should read -- Korkmaz et al., --.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*